United States Patent
Ibaraki

(10) Patent No.: US 7,159,020 B2
(45) Date of Patent: Jan. 2, 2007

(54) PRIORITY DETERMINATION APPARATUS, PRIORITY DETERMINATION METHOD, AND PRIORITY DETERMINATION PROGRAM

(75) Inventor: Hisami Ibaraki, Ibaraki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 1108 days.

(21) Appl. No.: 10/069,529

(22) PCT Filed: Jul. 9, 2001

(86) PCT No.: PCT/JP01/05951

§ 371 (c)(1), (2), (4) Date: Jun. 13, 2002

(87) PCT Pub. No.: WO02/05265

PCT Pub. Date: Jan. 17, 2002

(65) Prior Publication Data

US 2002/0174213 A1    Nov. 21, 2002

(30) Foreign Application Priority Data

Jul. 10, 2000 (JP) .......................... 2000-208092
Jul. 4, 2001 (JP) .......................... 2001-203753

(51) Int. Cl.
G06F 15/173 (2006.01)
G10L 15/00 (2006.01)

(52) U.S. Cl. .............. 709/223; 379/395.1; 704/231

(58) Field of Classification Search ................ 709/223; 704/231; 379/395.1
See application file for complete search history.

(56) References Cited

U.S. PATENT DOCUMENTS 5,247,580 A    9/1993    Kimura et al.
5,526,496 A    6/1996    Alnuweiri

FOREIGN PATENT DOCUMENTS

| EP | 0 239 298 A | 9/1987 |
| EP | 0 911 808 A | 4/1999 |
| GB | 2 123 251 A | 1/1984 |
| JP | 5-300507 | 11/1993 |
| JP | 8-320757 | 12/1996 |
| JP | 11-237892 | 8/1999 |

*Primary Examiner*—Krisna Lim
*Assistant Examiner*—Philip Chea
(74) *Attorney, Agent, or Firm*—Armstrong, Kratz, Quintos, Hanson & Brooks, LLP

(57) ABSTRACT

A communication control unit in an electronic apparatus judges the priorities and the types of connected other electronic apparatus or apparatuses by communicating with the other electronic apparatus or apparatuses in response to the change in the connected state with the other electronic apparatus or apparatuses, and feeds to a speech recognition operation inhibition setting unit information as to whether or not the electronic apparatus itself has the highest priority. The speech recognition operation inhibition setting unit sets the allowance or the inhibition of a speech recognition operation in a speech recognition operation judgment unit on the basis of judgment whether or not the electronic apparatus itself has the highest priority.

17 Claims, 16 Drawing Sheets

F I G. 4
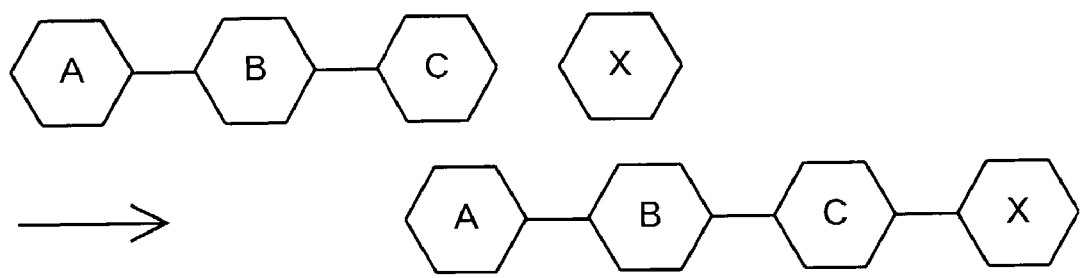
F I G. 5
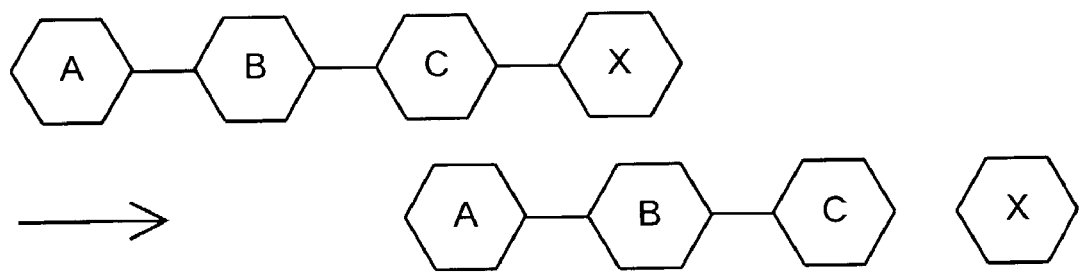

PRIORITY DETERMINATION APPARATUS, PRIORITY DETERMINATION METHOD, AND PRIORITY DETERMINATION PROGRAM

TECHNICAL FIELD

The present invention relates to a priority determination device, a priority determining method, and a priority determination program that determine priorities among connected electronic apparatuses.

BACKGROUND ART

In recent years, electronic apparatuses equipped with speech recognition devices have been developed. Here, examples of the electronic apparatuses equipped with speech recognition functions include television receivers, VTR (video tape recorders), CD players (compact disk players), video disk players, DVD players (digital versatile disk players), mini disk players, and video cameras.

FIG. 18 is a block diagram showing the configuration of a conventional electronic apparatus equipped with a speech recognition device.

In FIG. 18, an electronic apparatus 900 comprises a speech recognition device 950, an electronic apparatus control unit 906, and an electronic apparatus functional unit 907.

The speech recognition device 950 outputs, when the electronic apparatus 900 is so set as to be operated by a speech recognition operation, a command signal to the electronic apparatus control unit 906 on the basis of a command issued by speech from the exterior. Further, when the electronic apparatus 900 is so set as not to be operated by the speech recognition operation, the speech recognition device 950 does not output the command signal to the electronic apparatus control unit 906 even in a case where the command is issued by the speech.

The speech recognition device 950 comprises a speech instruction input unit 901, a speech recognition unit 902, a communication control unit 903, a speech recognition operation inhibition setting unit 904, and a speech recognition operation judgment unit 905.

The speech instruction input unit 901 is composed of a microphone or the like, and inputs the speech as an audio signal to the speech recognition unit 902.

The speech recognition unit 902 searches a speech dictionary on the basis of the inputted audio signal, recognizes the command issued by the audio signal, and outputs the results of the recognition as a command signal to the speech recognition operation judgment unit 905.

The communication control unit 903 receives, when it performs such setting that the electronic apparatus 900 performs no speech recognition operation by communication means, a signal indicating that a speech recognition operation is inhibited from a communication control unit 908 in another electronic apparatus, and outputs the received signal to the speech recognition operation inhibition setting unit 904.

The speech recognition operation inhibition setting unit 904 sets the inhibition or the allowance of the speech recognition operation in the speech recognition operation judgment unit 905 on the basis of a manual operation or information from the communication control unit 903.

The speech recognition operation judgment unit 905 is composed of a memory and a microcomputer. The microcomputer performs various types of operations on the basis of the information stored in the memory and the information fed by the speech recognition unit 902 and the speech recognition operation inhibition setting unit 904.

When the speech recognition operation is allowed by the speech recognition operation inhibition setting unit 904, the speech recognition operation judgment unit 905 outputs the command signal to the electronic apparatus control unit 906 on the basis of the command fed by the speech recognition unit 902. Further, when the speech recognition operation is inhibited by the speech recognition operation inhibition setting unit 904, the speech recognition operation judgment unit 905 does not output the command signal to the electronic apparatus control unit 906 even if the command is fed by the speech recognition unit 902.

The electronic apparatus control unit 906 receives the command signal by a manual operation or the speech recognition operation of the speech recognition device 950, to control the electronic apparatus functional unit 907.

The electronic apparatus functional unit 907 performs the inherent function of the electronic apparatus 900 by the control of the electronic apparatus control unit 906. When the electronic apparatus 900 is a television receiver, the inherent function of the electronic apparatus 900 means the turn-on and the turn-off of a power supply, the receiving of a television signal, the selection of a receiving channel, the display of video, the output of speech, etc. Consequently, the inherent function of the electronic apparatus 900 is specified depending on what is the electronic apparatus 900.

DISCLOSURE OF INVENTION

An object of the present invention is to provide a priority determination device, a priority determining method, and a priority determination program that can automatically determine priorities among connected electronic apparatuses when the connected state is changed.

Another object of the present invention is to provide a priority determination device, a priority determining method, and a priority determination program that can automatically determine priorities among connected electronic apparatuses when the states of power supplies are changed.

A priority determination device according to an aspect of the present invention is a priority determination device provided in one of a plurality of electronic apparatuses that can be connected to one another, are respectively assigned priorities, and respectively have operation units each performing a predetermined operation, comprising connected state detection means for detecting the change in the connected state of the plurality of electronic apparatuses; identification means for identifying the electronic apparatus or apparatuses, other than the one electronic apparatus, connected after the change in the connected state by communicating with the other electronic apparatus or apparatuses in response to the detection of the change by the connected state detection means; judgment means for judging whether or not the one electronic apparatus has the highest priority on the basis of the priority of each of the electronic apparatuses identified by the identification means; and operation allowance/inhibition means for allowing the operation performed by the operation unit when the judgment means judges that the one electronic apparatus has the highest priority, while inhibiting the operation performed by the operation unit when the judgment means judges that the one electronic apparatus does not have the highest priority.

In the priority determination device according to the present invention, when the connected state detection means detects the change in the connected state of the plurality of electronic apparatuses, the identification means identifies the other electronic apparatus or apparatuses connected after the change in the connected state by communicating with the other electronic apparatus or apparatuses in response to the detection of the change. The judgment means judges, on the basis of the priority of each of the identified electronic apparatuses, whether or not the self electronic apparatus has the highest priority. The operation allowance/inhibition means allows the operation performed by the operation unit when the judgment means judges that the electronic apparatus has the highest priority, while inhibiting the operation performed by the operation unit when the judgment means judges that the electronic apparatus does not have the highest priority.

Thus, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the connected state is changed, the highest priority among the electronic apparatuses is automatically judged. Accordingly, a user need not perform complicated setting for the electronic apparatus.

The identification means may comprise communication means for receiving the identification information from the other electronic apparatus or apparatuses connected after the change in the connected state in response to the detection of the change by the connected state detection means, and transmitting the self identification information to the other electronic apparatus or apparatuses connected after the change in the connected state, and the judgment means may comprise comparison means for comparing the identification information for the other electronic apparatus or apparatuses received by the communication means with the self identification information, to judge whether or not the one electronic apparatus has the highest priority.

In this case, the communication means receives the identification information from the other electronic apparatus or apparatuses connected after the change in the connected state in response to the detection of the change by the connected state detection means, and transmits the self identification information to the other electronic apparatus or apparatuses connected after the change in the connected state. The comparison means compares the identification information for the other electronic apparatus or apparatuses received by the communication means with the self identification information, thereby judging whether or not the self electronic apparatus has the highest priority.

When the connected state of the electronic apparatuses is thus changed, the priorities of the electronic apparatus or apparatuses connected after the change in the connected state are judged by the communication and the comparison of the identification information.

The priority determination device may further comprise storage means for storing apparatus connection information representing the electronic apparatuses which are connected to one another on the basis of the identification information for the other electronic apparatus or apparatuses received by the communication means, and the operation unit may have the function of operating the electronic apparatuses connected on the basis of the apparatus connection information stored in the storage means.

In this case, the storage means stores the apparatus connection information representing the electronic apparatuses which are connected to one another on the basis of the identification information for the other electronic apparatus or apparatuses received by the communication means. The electronic apparatuses connected on the basis of the apparatus connection information stored by the storage means are operated by the operation unit.

Consequently, the user need not set the information related to the connected electronic apparatuses when the connected state of the electronic apparatuses is changed.

The priority determination device may further comprise power supply state detection means for detecting the change in the states of power supplies in the plurality of electronic apparatuses which are connected to one another, identification means for identifying the electronic apparatus in which the power supply is in the on state out of the other electronic apparatus or apparatuses connected after the change in the states of the power supplies by communicating with the connected other electronic apparatus or apparatuses in response to the detection of the change by the power supply state detection means, judgment means for judging whether or not the one electronic apparatus has the highest priority on the basis of the priority of each of the electronic apparatuses identified by the identification means, and operation allowance/inhibition means for allowing the operation performed by the operation unit when the judgment means judges that the one electronic apparatus has the highest priority, while inhibiting the operation performed by the operation unit when the judgment means judges that the one electronic apparatus does not have the highest priority.

In this case, when the power supply state detection means detects the change in the states of the power supplies in the plurality of electronic apparatuses, the identification means identifies the electronic apparatus in which the power supply is in the on state out of the other electronic apparatus or apparatuses connected after the change in the states of the power supplies by communicating with the other electronic apparatus or apparatuses in response to the detection of the change. The judgment means judges, on the basis of the priority of each of the identified electronic apparatuses, whether or not the one electronic apparatus has the highest priority. The operation allowance/inhibition means allows the operation performed by the operation unit when the judgment means judges that the electronic apparatus has the highest priority, while inhibiting the operation performed by the operation unit when the judgment means judges that the electronic apparatus does not have the highest priority.

Thus, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the states of the power supplies are changed, the highest priority among the electronic apparatuses is automatically judged. Accordingly, the user need not perform complicated setting for the electronic apparatus.

The identification means may comprise communication means for receiving the identification information, together with power supply information representing the states of the power supplies, from the other electronic apparatus or apparatuses connected after the change in the states of the power supplies in response to the detection of the change by the power supply state detection means, and transmitting power supply information representing the state of the self power supply, together with the self identification information, to the other electronic apparatus or apparatuses connected after the change in the connected state, and the judgment means may comprise comparison means for comparing the identification information for the electronic apparatuses in which the power supplies are in the on state on the basis of the power supply information for the other electronic apparatus or apparatuses and the self power supply information which have been received by the communication means, to judge whether or not the one electronic apparatus out of the electronic apparatuses in which the power supplies are in the on state has the highest priority.

In this case, the communication means receives the identification information and the power supply information from the other electronic apparatus or apparatuses connected after the change in the connected state in response to the detection of the change by the power supply state detection means, and transmits the self identification information and the self power supply information to the other electronic apparatus or apparatuses connected after the change in the states of the power supplies. The comparison means compares the identification information for the electronic apparatuses in which the power supplies are in the on state, thereby judging whether or not the one electronic apparatus has the highest priority.

When the states of the power supplies in the electronic apparatuses are thus changed, the priorities of the electronic apparatus or apparatuses connected after the change in the states of the power supplies are judged by the communication and the comparison of the identification information and the power supply information.

The operation unit may comprise a speech recognition operation unit that performs a speech recognition operation.

In this case, the user can operate the connected electronic apparatuses using the speech recognition operation of the electronic apparatus which is determined to have the highest priority by the priority determination device.

A priority determination device according to another aspect of the present invention is a priority determination device provided in one of a plurality of electronic apparatuses that can be connected to one another, are respectively assigned priorities, and respectively have operation units each performing a predetermined operation, comprising power supply state detection means for detecting the change in the states of power supplies in the plurality of electronic apparatuses which are connected to one another; identification means for identifying the electronic apparatus in which the power supply is in the on state out of the electronic apparatus or apparatuses, other than the one electronic apparatus, connected after the change in the states of the power supplies by communicating with the connected other electronic apparatus or apparatuses in response to the detection of the change by the power supply state detection means; judgment means for judging whether or not the one electronic apparatus has the highest priority on the basis of the priority of each of the electronic apparatuses identified by the identification means; and operation allowance/inhibition means for allowing the operation performed by the operation unit when the judgment means judges that the one electronic apparatus has the highest priority, while inhibiting the operation performed by the operation unit when the judgment means judges that the one electronic apparatus does not have the highest priority.

In the priority determination device according to the present invention, when the power supply state detection means detects the change in the states of the power supplies in the plurality of electronic apparatuses, the identification means identifies the electronic apparatus in which the power supply is in the on state out of the other electronic apparatus or apparatuses connected after the change in the states of the power supplies by communicating with the other electronic apparatus or apparatuses in response to the detection of the change. The judgment means judges, on the basis of the priority of each of the identified electronic apparatuses, whether or not the one electronic apparatus has the highest priority. The operation allowance/inhibition means allows the operation performed by the operation unit when the judgment means judges that the electronic apparatus has the highest priority, while inhibiting the operation performed by the operation unit when the judgment means judges that the electronic apparatus does not have the highest priority.

Thus, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the states of the power supplies are changed, the highest priority among the electronic apparatuses is automatically judged. Accordingly, the user need not perform complicated setting for the electronic apparatus.

The priority determination device may be so adapted that priorities are previously set, respectively, in identification information for identifying the plurality of electronic apparatuses, the identification means may comprise communication means for receiving the identification information, together with power supply information representing the states of the power supplies, from the other electronic apparatus or apparatuses connected after the change in the states of the power supplies in response to the detection of the change by the power supply state detection means, and transmitting power supply information representing the state of the self power supply, together with the self identification information, to the other electronic apparatus or apparatuses connected after the change in the connected state, and the judgment means may comprise comparison means for comparing the identification information for the electronic apparatuses in which the power supplies are in the on state on the basis of the power supply information for the other electronic apparatus or apparatuses and the self power supply information which have been received by the communication means, to judge whether or not the one electronic apparatus out of the electronic apparatuses in which the power supplies are in the on state has the highest priority.

In this case, the communication means receives the identification information and the power supply information from the other electronic apparatus or apparatuses connected after the change in the connected state in response to the detection of the change by the power supply state detection means, and transmits the self identification information and the self power supply information to the other electronic apparatus or apparatuses connected after the change in the states of the power supplies. The comparison means compares the identification information for the electronic apparatuses in which the power supplies are in the on state, thereby judging whether or not the one electronic apparatus has the highest priority.

When the states of the power supplies in the electronic apparatuses are thus changed, the priorities of the electronic apparatus or apparatuses connected after the change in the states of the power supplies are judged by the communication and the comparison of the identification information and the power supply information.

The priority determination device may further comprises storage means for storing apparatus connection information representing the electronic apparatuses which are connected to one another on the basis of the identification information for the other electronic apparatus or apparatuses received by the communication means, and the operation unit may have the function of operating the electronic apparatuses connected on the basis of the apparatus connection information stored in the storage means.

In this case, the storage means stores the apparatus connection information representing the electronic apparatuses which are connected to one another on the basis of the identification information for the other electronic apparatus or apparatuses received by the communication means. The electronic apparatuses connected on the basis of the apparatus connection information stored by the storage means are operated by the operation unit.

Consequently, the user need not set the information related to the electronic apparatus in which the power supply is in the on state when the states of the power supplies in the electronic apparatuses are changed.

The operation unit may comprise a speech recognition operation unit that performs a speech recognition operation.

In this case, the user can operate the electronic apparatuses in which the power supplies are in the on state using the speech recognition operation of the electronic apparatus which is determined to have the highest priority by the priority determination device.

A priority determining method according to another aspect of the present invention is a priority determining method provided in one of a plurality of electronic apparatuses that can be connected to one another, are respectively assigned priorities, and respectively have operation units each performing a predetermined operation, comprising the steps of detecting the change in the connected state of the plurality of electronic apparatuses; identifying the electronic apparatus or apparatuses, other than the one electronic apparatus, connected after the change in the connected state by communicating with the other electronic apparatus or apparatuses in response to the detection of the change; judging whether or not the one electronic apparatus has the highest priority on the basis of the priority of each of the identified electronic apparatuses; and allowing the operation performed by the operation unit when it is judged that the one electronic apparatus has the highest priority, while inhibiting the operation performed by the operation unit when it is judged that the one electronic apparatus does not have the highest priority.

In the priority determining method according to the present invention, when the change in the connected state of the plurality of electronic apparatuses is detected, the other electronic apparatus or apparatuses connected after the change in the connected state are identified by communicating with the other electronic apparatus or apparatuses in response to the detection of the change. It is judged, on the basis of the priority of each of the identified electronic apparatuses, whether or not the one electronic apparatus has the highest priority. The operation performed by the opera- tion unit is allowed when it is judged that the electronic apparatus has the highest priority, while being inhibited when it is judged that the electronic apparatus does not have the highest priority.

Thus, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the connected state is changed, the highest priority among the electronic apparatuses is automatically judged. Accordingly, the user need not perform complicated setting for the electronic apparatus.

The priority determining method may be so adapted that priorities are previously set, respectively, in identification information for identifying the plurality of electronic apparatuses, the identifying step may comprise the step of receiving the identification information from the other electronic apparatus or apparatuses connected after the change in the connected state in response to the detection of the change in the connected state by the step of detecting the change, and transmitting the self identification information to the other electronic apparatus or apparatuses connected after the change in the connected state, and the judging step may comprise the step of judging whether or not the one electronic apparatus has the highest priority by comparing the identification information for the other electronic apparatus or apparatuses received by the communication means with the self identification information.

In this case, the identification information from the other electronic apparatus or apparatuses connected after the change in the connected state are received in response to the detection of the change, and the self identification information is transmitted to the other electronic apparatus or apparatuses connected after the change in the connected state. The received identification information for the other electronic apparatus or apparatuses are compared with the self identification information, thereby judging whether or not the self electronic apparatus has the highest priority.

When the connected state of the electronic apparatuses is thus changed, the priorities of the electronic apparatus or apparatuses connected after the change in the connected state are judged by the communication and the comparison of the identification information.

The priority determining method may further comprise the step of storing apparatus connection information representing the electronic apparatuses which are connected to one another on the basis of the received identification information for the other electronic apparatus or apparatuses, and the operation unit may operate the electronic apparatuses connected on the basis of the stored apparatus connection information.

In this case, the apparatus connection information representing the electronic apparatuses which are connected to one another is stored on the basis of the received identification information for the other electronic apparatus or apparatuses. The electronic apparatuses connected on the basis of the stored apparatus connection information are operated by the operation unit.

Consequently, the user need not set the information related to the connected electronic apparatuses when the connected state of the electronic apparatuses is changed.

A priority determining method according to still another aspect of the present invention is a priority determining method provided in one of a plurality of electronic apparatuses that can be connected to one another, are respectively assigned priorities, and respectively have operation units each performing a predetermined operation, comprising the steps of detecting the change in the states of power supplies in the plurality of electronic apparatuses which are connected to one another; identifying the electronic apparatus in which the power supply is in the on state out of the electronic apparatus or apparatuses, other than the one electronic apparatus, connected after the change in the states of the power supplies by communicating with the connected other electronic apparatus or apparatuses in response to the detection of the change in the states of the power supplies by the step of detecting the change; judging whether or not the one electronic apparatus has the highest priority on the basis of the priority of each of the electronic apparatuses identified by the step of identifying the electronic apparatus in which the power supply is in the on state; and allowing the operation performed by the operation unit when it is judged that the one electronic apparatus has the highest priority, while inhibiting the operation performed by the operation unit when it is judged that the one electronic apparatus does not have the highest priority.

In the priority determining method according to the present invention, when the change in the states of the power supplies in the plurality of electronic apparatuses is detected, the electronic apparatus in which the power supply is in the on state out of the other electronic apparatus or apparatuses connected after the change in the states of the power supplies are identified by communicating with the other electronic apparatus or apparatuses in response to the detection of the change. It is judged, on the basis of the priority of each of the identified electronic apparatuses, whether or not the one electronic apparatus has the highest priority. The operation performed by the operation unit is allowed when it is judged that the electronic apparatus has the highest priority, while being inhibited when it is judged that the electronic apparatus does not have the highest priority.

Thus, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the states of the power supplies are changed, the highest priority among the electronic apparatuses is automatically judged. Accordingly, the user need not perform complicated setting for the electronic apparatus.

The priority determining method may be so adapted that priorities are previously set, respectively, in identification information for identifying the plurality of electronic apparatuses, the identifying step may comprise the step of receiving the identification information, together with power supply information representing the states of the power supplies, from the other electronic apparatus or apparatuses connected after the change in the states of the power supplies in response to the detection of the change, and transmitting the power supply information representing the state of the self power supply, together with the self identification information, to the other electronic apparatus or apparatuses connected after the change in the connected state, and the judging step may comprise the step of judging whether or not the one electronic apparatus out of the electronic apparatuses in which the power supplies are in the on state has the highest priority by comparing the identification information for the electronic apparatuses in which the power supplies are in the on state on the basis of the power supply information for the other electronic apparatus or apparatuses and the self power supply information which have been received.

In this case, the identification information and the power supply information from the other electronic apparatus or apparatuses connected after the change in the connected state are received in response to the detection of the change, and the self identification information and the self power supply information are transmitted to the other electronic apparatus or apparatuses connected after the change in the states of the power supplies. The identification information for the electronic apparatuses in which the power supplies are in the on state are compared, thereby judging whether or not the one electronic apparatus has the highest priority.

When the states of the power supplies in the electronic apparatuses are thus changed, the priorities of the electronic apparatus or apparatuses connected after the change in the states of the power supplies are judged by the communication and the comparison of the identification information and the power supply information.

The priority determining method may further comprise the step of storing apparatus connection information representing the electronic apparatuses which are connected to one another on the basis of the received identification information for the other electronic apparatus or apparatuses, and the operation unit may operate the electronic apparatuses connected on the basis of the stored apparatus connection information.

In this case, the apparatus connection information representing the electronic apparatuses which are connected to one another is stored on the basis of the received identification information for the other electronic apparatus or apparatuses. The electronic apparatuses connected on the basis of the stored apparatus connection information are operated by the operation unit.

Consequently, the user need not set the information related to the electronic apparatus in which the power supply is in the on state when the states of the power supplies in the electronic apparatuses are changed.

A priority determination program according to a further aspect of the present invention is a priority determination program executed by a processing device in one of a plurality of electronic apparatuses that can be connected to one another, are respectively assigned priorities, and respectively have operation units each performing a predetermined operation, comprising processing for detecting the change in the connected state of the plurality of electronic apparatuses; processing for identifying the electronic apparatus or apparatuses, other than the one electronic apparatus, connected after the change in the connected state by communicating with the other electronic apparatus or apparatuses in response to the detection of the change; processing for judging whether or not the one electronic apparatus has the highest priority on the basis of the priority of each of the identified electronic apparatuses; and processing for allowing the operation performed by the operation unit when it is judged that the one electronic apparatus has the highest priority, while inhibiting the operation performed by the operation unit when it is judged that the one electronic apparatus does not have the highest priority.

In the priority determination program according to the present invention, when the change in the connected state of the plurality of electronic apparatuses is detected, the other electronic apparatus or apparatuses connected after the change in the connected state are identified by communicating with the other electronic apparatus or apparatuses in response to the detection of the change. It is judged, on the basis of the priority of each of the identified electronic apparatuses, whether or not the one electronic apparatus has the highest priority. The operation performed by the operation unit is allowed when it is judged that the electronic apparatus has the highest priority, while being inhibited when it is judged that the electronic apparatus does not have the highest priority.

Thus, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the connected state is changed, the highest priority among the electronic apparatuses is automatically judged. Accordingly, the user need not perform complicated setting for the electronic apparatus.

The priority determination program may be so adapted that priorities are previously set, respectively, in identification information for identifying the plurality of electronic apparatuses, the identifying processing may comprise processing for receiving the identification information from the other electronic apparatus or apparatuses connected after the change in the connected state in response to the detection of the change in the connected state by the processing for detecting the change, and transmitting the self identification information to the other electronic apparatus or apparatuses connected after the change in the connected state, and the judging processing may comprise processing for judging whether or not the one electronic apparatus has the highest priority by comparing the received identification information for the other electronic apparatus or apparatuses with the self identification information.

In this case, the identification information from the other electronic apparatus or apparatuses connected after the change in the connected state are received in response to the detection of the change, and the self identification information is transmitted to the other electronic apparatus or apparatuses connected after the change in the connected state. The received identification information for the other electronic apparatus or apparatuses are compared with the self identification information, thereby judging whether or not the one electronic apparatus has the highest priority.

When the connected state of the electronic apparatuses is thus changed, the priorities of the electronic apparatus or apparatuses connected after the change in the connected state are judged by the communication and the comparison of the identification information.

The priority determination program may further comprise processing for storing apparatus connection information representing the electronic apparatuses which are connected to one another on the basis of the received identification information for the other electronic apparatus or apparatuses, and the operation unit may operate the electronic apparatuses connected on the basis of the stored apparatus connection information.

In this case, the apparatus connection information representing the electronic apparatuses which are connected to one another is stored on the basis of the received identification information for the other electronic apparatus or apparatuses. The electronic apparatuses connected on the basis of the stored apparatus connection information are operated by the operation unit.

Consequently, the user need not set the information related to the connected electronic apparatuses when the connected state of the electronic apparatuses is changed.

A priority determination program according to a still further aspect of the present invention is a priority determination program executed by a processing device in one of a plurality of electronic apparatuses that can be connected to one another, are respectively assigned priorities, and respectively have operation units each performing a predetermined operation, comprising processing for detecting the change in the states of power supplies in the plurality of electronic apparatuses which are connected to one another; processing for identifying the electronic apparatus in which the power supply is in the on state out of the electronic apparatus or apparatuses, other than the one electronic apparatus, connected after the change in the states of the power supplies by communicating with the connected other electronic apparatus or apparatuses in response to the detection of the change in the states of the power supplies by the processing for detecting the change; processing for judging whether or not the one electronic apparatus has the highest priority on the basis of the priority of each of the identified electronic apparatuses; and processing for allowing the operation performed by the operation unit when it is judged that the one electronic apparatus has the highest priority, while inhibiting the operation performed by the operation unit when it is judged that the one electronic apparatus does not have the highest priority.

In the priority determination program according to the present invention, when the change in the states of the power supplies in the plurality of electronic apparatuses is detected, the electronic apparatus in which the power supply is in the on state out of the other electronic apparatus or apparatuses connected after the change in the states of the power supplies is identified by communicating with the other electronic apparatus or apparatuses in response to the detection of the change. It is judged, on the basis of the priority of each of the identified electronic apparatuses, whether or not the one electronic apparatus has the highest priority. The operation performed by the operation unit is allowed when it is judged that the electronic apparatus has the highest priority, while being inhibited when it is judged that the electronic apparatus does not have the highest priority.

Thus, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the states of the power supplies are changed, the highest priority among the electronic apparatuses is automatically judged. Accordingly, the user need not perform complicated setting for the electronic apparatus.

The priority determination program may be so adapted that priorities are previously set, respectively, in identification information for identifying the plurality of electronic apparatuses, the identifying processing may comprise processing for receiving the identification information, together with power supply information representing the states of the power supplies, from the other electronic apparatus or apparatuses connected after the change in the states of the power supplies in response to the detection of the change, and transmitting power supply information representing the state of the self power supply, together with the self identification information, to the other electronic apparatus or apparatuses connected after the change in the connected state, and the judging processing may comprise processing for judging whether or not the one electronic apparatus out of the electronic apparatuses in which the power supplies are in the on state has the highest priority by comparing the identification information for the electronic apparatuses in which the power supplies are in the on state on the basis of the power supply information for the other electronic apparatus or apparatuses and the self power supply information which have been received.

In this case, the identification information and the power supply information from the other electronic apparatus or apparatuses connected after the change in the connected state are received in response to the detection of the change, and the self identification information and the self power supply information are transmitted to the other electronic apparatus or apparatuses connected after the change in the states of the power supplies. The identification information for the electronic apparatuses in which the power supplies are in the on state are compared, thereby judging whether or not the one electronic apparatus has the highest priority.

When the states of the power supplies in the electronic apparatuses are thus changed, the priorities of the electronic apparatus or apparatuses connected after the change in the states of the power supplies are judged by the communication and the comparison of the identification information and the power supply information.

The priority determination program may further comprise processing for storing apparatus connection information representing the electronic apparatuses which are connected to one another on the basis of the received identification information for the other electronic apparatus or apparatuses, and the operation unit may operate the electronic apparatuses connected on the basis of the stored apparatus connection information.

In this case, the apparatus connection information representing the electronic apparatuses which are connected to one another is stored on the basis of the received identification information for the other electronic apparatus or apparatuses. The electronic apparatuses connected on the basis of the stored apparatus connection information are operated by the operation unit.

Consequently, the user need not set the information related to the electronic apparatus in which the power supply is in the on state when the states of the power supplies in the electronic apparatuses are changed.

An electronic apparatus according to yet still another aspect of the present invention is an electronic apparatus that can be connected to the other electronic apparatus or apparatuses, wherein the electronic apparatus has an inherent number capable of determining a priority in a predetermined function in the connected state with the other electronic apparatus or apparatuses.

In this case, the priority can be determined by the inherent number in the connected state with the other electronic apparatus or apparatuses.

According to the present invention, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the connected state is changed, the highest priority among the electronic apparatuses is automatically judged. Accordingly, the user need not perform complicated setting for the electronic apparatus.

Furthermore, the mutual existence of the connected electronic apparatuses is recognized among the electronic apparatuses, and the electronic apparatus having the highest priority is judged. The operation performed by the operation unit in the electronic apparatus having the highest priority is allowed, and the operations performed by the operation units in the other electronic apparatus or apparatuses are inhibited. Consequently, it is possible to operate the operation unit in the electronic apparatus having the highest priority out of the plurality of connected electronic apparatuses. Further, every time the states of the power supplies are changed, the highest priority among the electronic apparatuses is automatically judged. Accordingly, the user need not perform complicated setting for the electronic apparatus.

BRIEF DESCRIPTION OF DRAWINGS

FIG. 4 is a schematic view showing the change in the connected state among the four types of electronic apparatuses in the first embodiment.

FIG. 5 is a schematic view showing the change in the connected state among the four types of electronic apparatuses in the first embodiment.

BEST MODE FOR CARRYING OUT THE INVENTION

Embodiments of the present invention will be described on the basis of FIGS. 1 to 17.

First Embodiment

Figure 1:
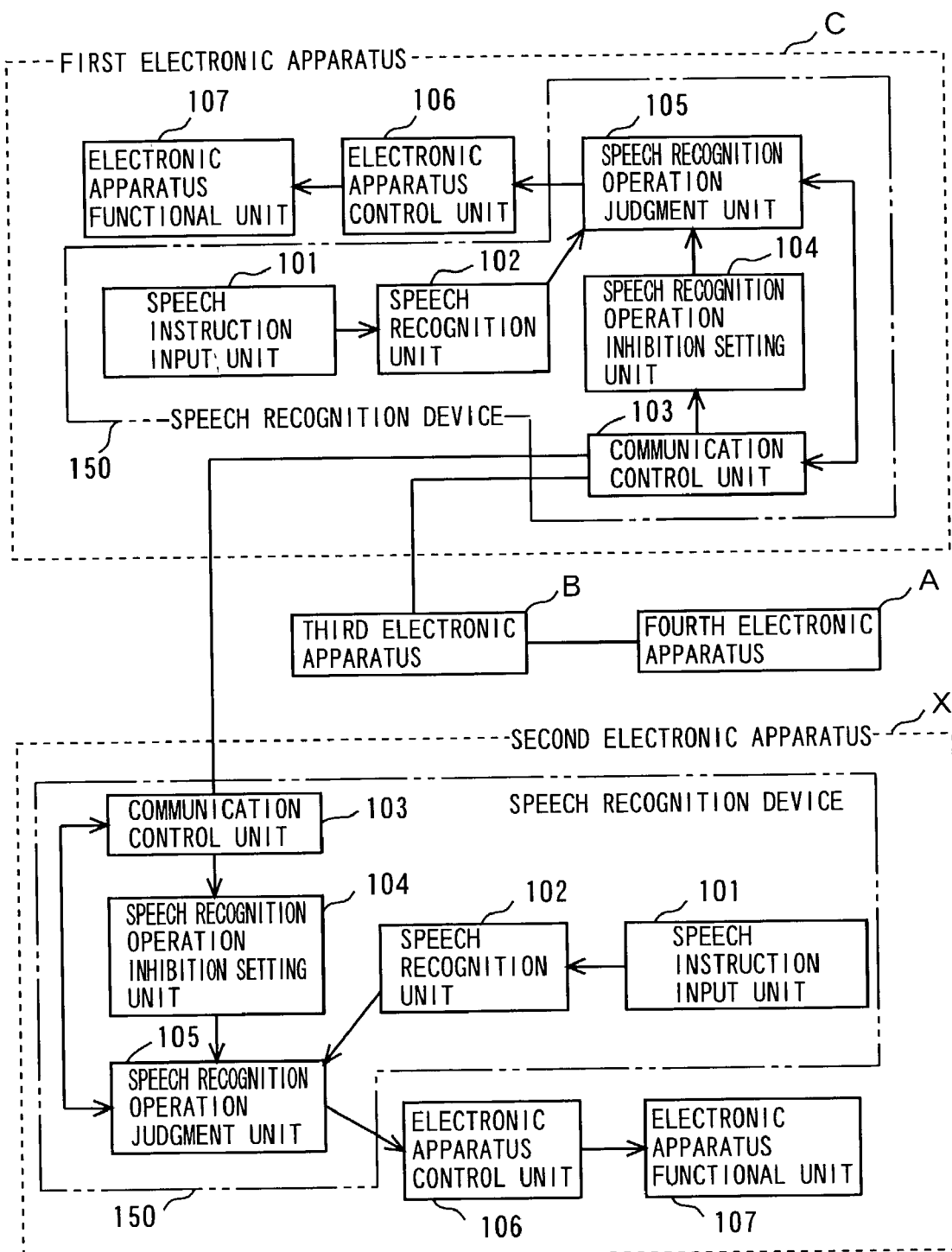
FIG. 1 is a block diagram showing the connection of four types of electronic apparatuses each comprising a priority determination device in a first embodiment.

FIG. 1 is a block diagram showing the connection of four types of electronic apparatuses each comprising a priority determination device in a first embodiment. In FIG. 1, the configurations of the two types of electronic apparatuses are illustrated. It is assumed that the four electronic apparatuses are arranged near to one another.

In FIG. 1, a first electronic apparatus C (hereinafter referred to as an apparatus C) comprises a speech recognition device 150, an electronic apparatus control unit 106, and an electronic apparatus functional unit 107.

When the apparatus C is so set as to be operated by a speech recognition operation, the speech recognition device 150 outputs a command signal to the electronic apparatus control unit 106 on the basis of a command issued by speech from the exterior. When the apparatus C is so set as not to be operated by the speech recognition operation, the speech recognition device 150 does not output the command signal to the electronic apparatus control unit 106 even when the command is issued by the speech.

In the first embodiment, the speech recognition device 150 determines, when it is connected to the other electronic apparatuses, priorities among the connected electronic apparatuses, and performs a speech recognition function when the electronic apparatus provided therewith has the highest priority. Priority determination processing will be described later.

The speech recognition device 150 comprises a speech instruction input unit 101, a speech recognition unit 102, a communication control unit 103, a speech recognition operation inhibition setting unit 104, and a speech recognition operation judgment unit 105. In the present embodiment, the communication control unit 103 constitutes a priority determination device.

The speech instruction input unit 101 is composed of a microphone or the like, and inputs speech as an audio signal to the speech recognition unit 102.

The speech recognition unit 102 searches a speech dictionary on the basis of the inputted audio signal, recognizes a command issued by the audio signal, and outputs the results of the recognition as a command signal to the speech recognition operation judgment unit 105.

The communication control unit 103 judges the priority and the type of the connected electronic apparatus in response to the change in the connected state with the other electronic apparatuses, and performs various types of operations on the basis of the results of the judgment. Here, the other electronic apparatuses are a second electronic apparatus X, a third electronic apparatus B, and a fourth electronic apparatus A. The communication control unit 103 feeds to the speech recognition operation inhibition setting unit 104 information as to whether or not the apparatus C has the highest priority. Further, the communication control unit 103 outputs, in a case where it operates the other electronic apparatuses when it is connected to the other electronic apparatuses, a command signal fed from the speech recognition operation judgment unit 105 to the other electronic apparatuses.

The speech recognition operation inhibition setting unit 104 sets the inhibition or the allowance of the speech recognition operation in the speech recognition operation judgment unit 105 on the basis of a manual operation or the information from the communication control unit 103.

The speech recognition operation judgment unit 105 is composed of a memory and a computer. The memory stores information representing the types of the other electronic apparatuses which are fed by the communication control unit 103. The microcomputer performs various types of operations on the basis of the information stored in the memory and the information fed from the speech recognition unit 102, the speech recognition operation inhibition setting unit 104, and the communication control unit 103. Consequently, the speech recognition operation judgment unit 105 can operate not only the electronic apparatus provided therewith but also the other electronic apparatuses by the speech recognition operation.

When the speech recognition operation is allowed by the speech recognition operation inhibition setting unit 104, the speech recognition operation judgment unit 105 outputs the command signal to the electronic apparatus control unit 106 on the basis of the command fed by the speech recognition unit 102. Further, the speech recognition operation judgment unit 105 outputs, when it operates the connected other electronic apparatuses, the command signal to the communication control unit 103 on the basis of the command fed by the speech recognition unit 102, and operates the other electronic apparatuses through the communication control unit 103.

On the other hand, when the speech recognition operation is inhibited by the speech recognition operation inhibition setting unit 104, the speech recognition operation judgment unit 105 does not output the command signal to the electronic apparatus control unit 106 even if the command is fed by the speech recognition unit 102.

The electronic apparatus control unit 106 receives the command signal by a manual operation or the speech recognition operation of the speech recognition device 150, to control the electronic apparatus functional unit 107.

The electronic apparatus functional unit 107 performs the inherent function of the apparatus C by the control of the electronic apparatus control unit 107. Here, when the apparatus C is a television receiver, the inherent function of the apparatus C means the turn-on and turn-off of a power supply, the receiving of a television signal, the selection of a receiving channel, the display of video, the output of speech, etc. Consequently, the inherent function of the apparatus C is specified depending on what is the apparatus C.

Figure 2:
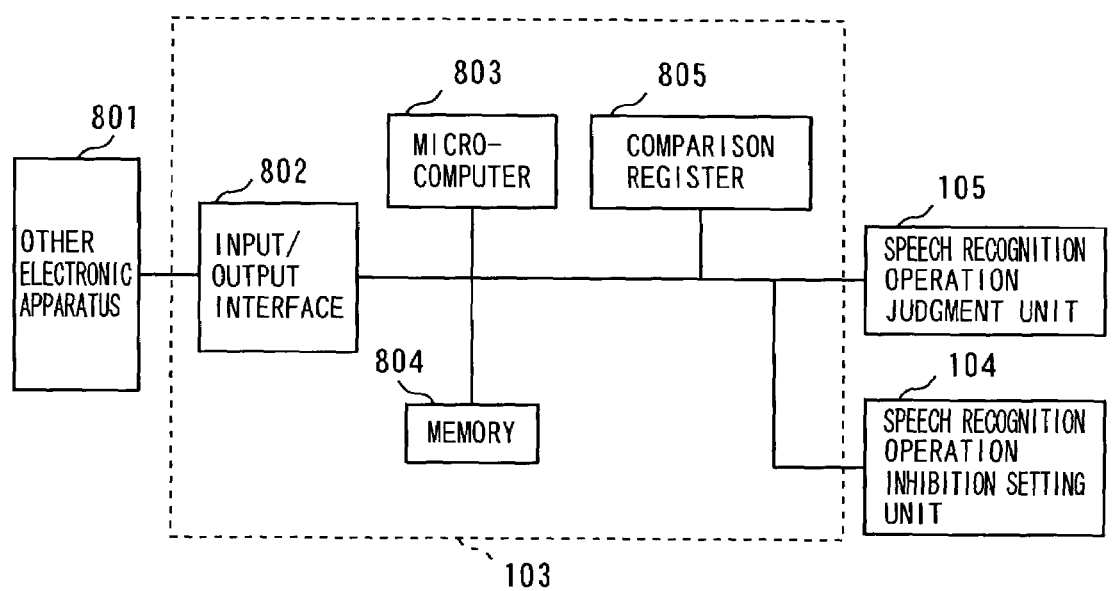
FIG. 2 is a block diagram showing the configuration of a communication control unit in the first embodiment.

FIG. 2 is a block diagram showing the configuration of the communication control unit 103 in the apparatus C. The configuration and the operations of the communication control unit 103 will be described on the basis of FIG. 2.

The communication control unit 103 comprises an input/output interface 802, a microcomputer 803, a memory 804, and a comparison register 805.

The input/output interface 802 is connected to the other electronic apparatus 801 by a cable, infrared communication, etc., and outputs to the microcomputer 803 a signal representing connection or disconnection. Here, the other electronic apparatus 801 corresponds to the second electronic apparatus X, the third electronic apparatus B, and the fourth electronic apparatus A shown in FIG. 1.

The microcomputer 803 performs various types of processing in response to the change in the connected state with the other electronic apparatus 801. The memory in the microcomputer 803 stores a priority determination program for executing priority determination processing shown in FIGS. 6 to 8. The priority determination program in the microcomputer 803 executes the priority determination program stored in the memory in the microcomputer 803, to perform the priority determination processing.

The memory 804 stores an ID (identification) number transmitted from the other electronic apparatus 801. The comparison register 805 is used for comparing the priorities of ID numbers.

The configuration and the operations of the second electronic apparatus X (hereinafter referred to as the apparatus X) are the same as the configuration and the operations of the apparatus C. The function of an electronic apparatus functional unit 107 in the apparatus X differs from the function of the electronic apparatus functional unit 107 in the apparatus C. When the inherent function of the apparatus X is a video tape recorder, for example, the electronic apparatus functional unit 107 has the functions such as recording and reproduction of a video tape.

The configurations and the operations of the third electronic apparatus B (hereinafter referred to as the apparatus B) and the fourth electronic apparatus A (hereinafter referred to as the apparatus A) are also the same as the operations of the apparatus C. However, the functions of electronic apparatus functional units 107 in the apparatuses B and A differ from the functions of the electronic apparatus functional units 107 in the apparatuses C and X.

Here, the outline of the flow of processing related to the recognition of the connected state and the judgment of the priorities will be described using FIG. 3.

Figure 3:
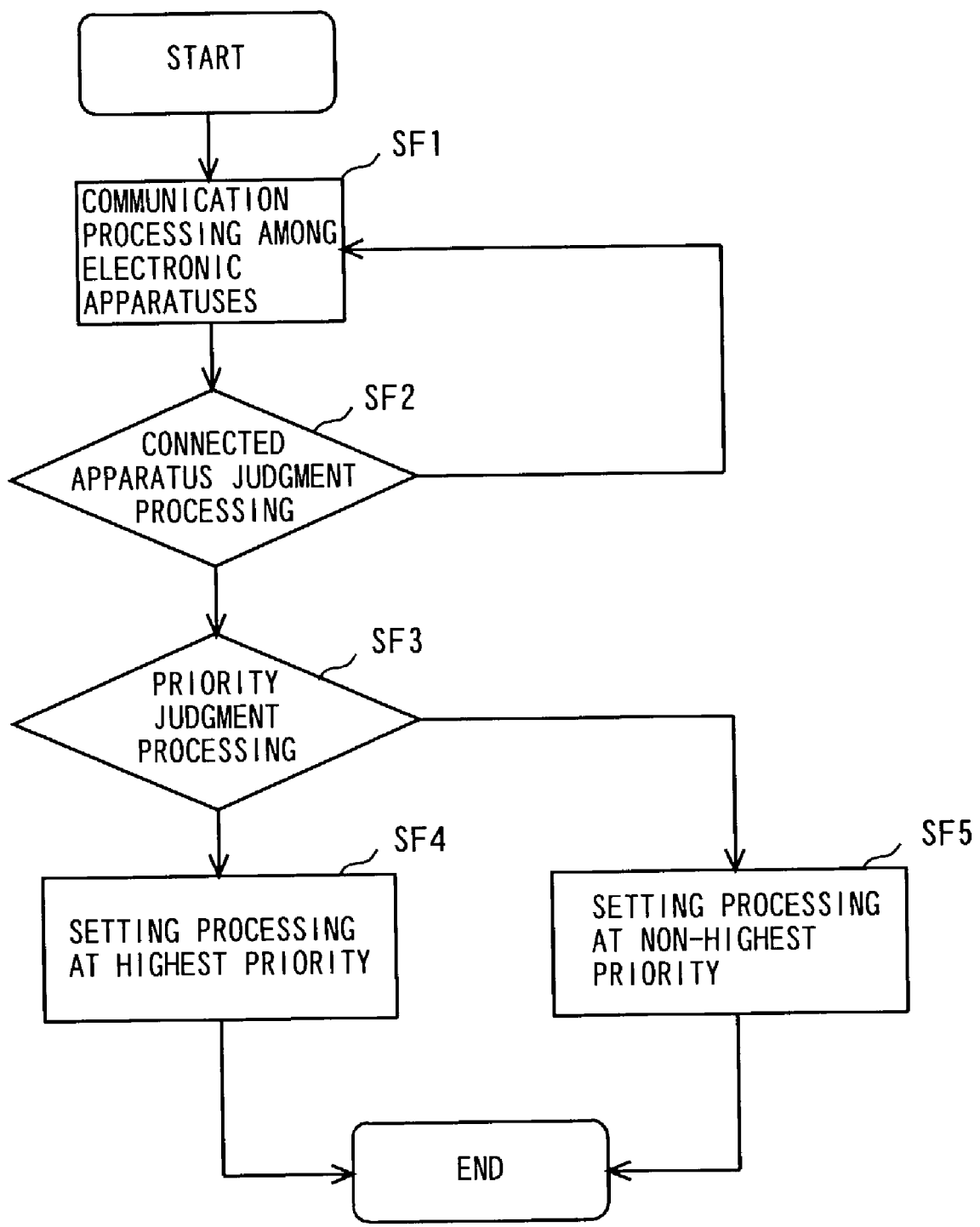
FIG. 3 is a diagram showing the outline of the flow of processing related to the recognition of a connected state and the judgment of priorities in the first embodiment.

FIG. 3 is a flow chart showing priority determination processing in a case where the connected state is changed in the electronic apparatus shown in FIG. 1. The outline of the flow, described below, is applied to all changes in the connected state among the electronic apparatuses.

First, communication processing is automatically started among the electronic apparatuses which are connected to one another as the connected state is changed (step SF1). Consequently, mutual communication is established with respect to information representing priorities for speech recognition and information representing the types of the connected electronic apparatuses.

Each of the electronic apparatuses judges whether or not any of the other electronic apparatuses must still communicate therewith (step SF2). Communication is established among all the connected electronic apparatuses by the electronic apparatus communication processing at the step SF1 and the connected apparatus judgment processing at the step SF2. Accordingly, each of the electronic apparatuses receives the information representing priorities for speech recognition from the other electronic apparatuses and the information representing the types of the connected other electronic apparatuses.

Thereafter, each of the electronic apparatuses judges the priority on the basis of the information received at the step SF1 and SF2 (step SF3). Here, each of the electronic apparatuses judges whether or not the apparatus itself has the highest priority. Consequently, the plurality of electronic apparatuses which are connected to one another are classified into the one electronic apparatus having the highest priority and the other electronic apparatuses having the non-highest priorities.

The electronic apparatus having the highest priority then performs setting processing at highest priority (step SF4). In this case, the communication control unit 103 outputs information representing the highest priority to the speech recognition operation inhibition setting unit 104, and outputs the information representing the types of the connected other electronic apparatuses to the speech recognition operation judgment unit 105. Consequently, the speech recognition operation inhibition setting unit 104 allows the speech recognition operation judgment unit 105 to perform the speech recognition operation by the speech instruction input unit 101 and the speech recognition unit 102.

On the other hand, the electronic apparatus having the non-highest priority performs setting processing at non-highest priority (step SF5). In this case, the communication control unit 103 outputs information representing the non-highest priority to the speech recognition operation inhibition setting unit 104, and outputs information representing the types of the connected other electronic apparatuses to the speech recognition operation inhibition judgment unit 105. Consequently, the speech recognition operation inhibition setting unit 104 inhibits the speech recognition operation judgment unit 105 from performing the speech recognition operation by the speech instruction input unit 101 and the speech recognition unit 102.

In the following description, the electronic apparatus having the highest priority out of the electronic apparatuses which are connected to one another is referred to as a master, and the electronic apparatus having the non-highest priority is referred to as a slave.

FIGS. 4 and 5 are schematic views showing the change in the connected state among the four types of electronic apparatuses shown in FIG. 1. FIG. 4 illustrates a case where the apparatus X is connected to the apparatus C in a state where the apparatus A, the apparatus B, and the apparatus C are connected to one another. FIG. 5 illustrates a case where the apparatus X is non-connected in a state where the apparatus A, the apparatus B, the apparatus C, and the apparatus X are connected to one another.

Figure 6:
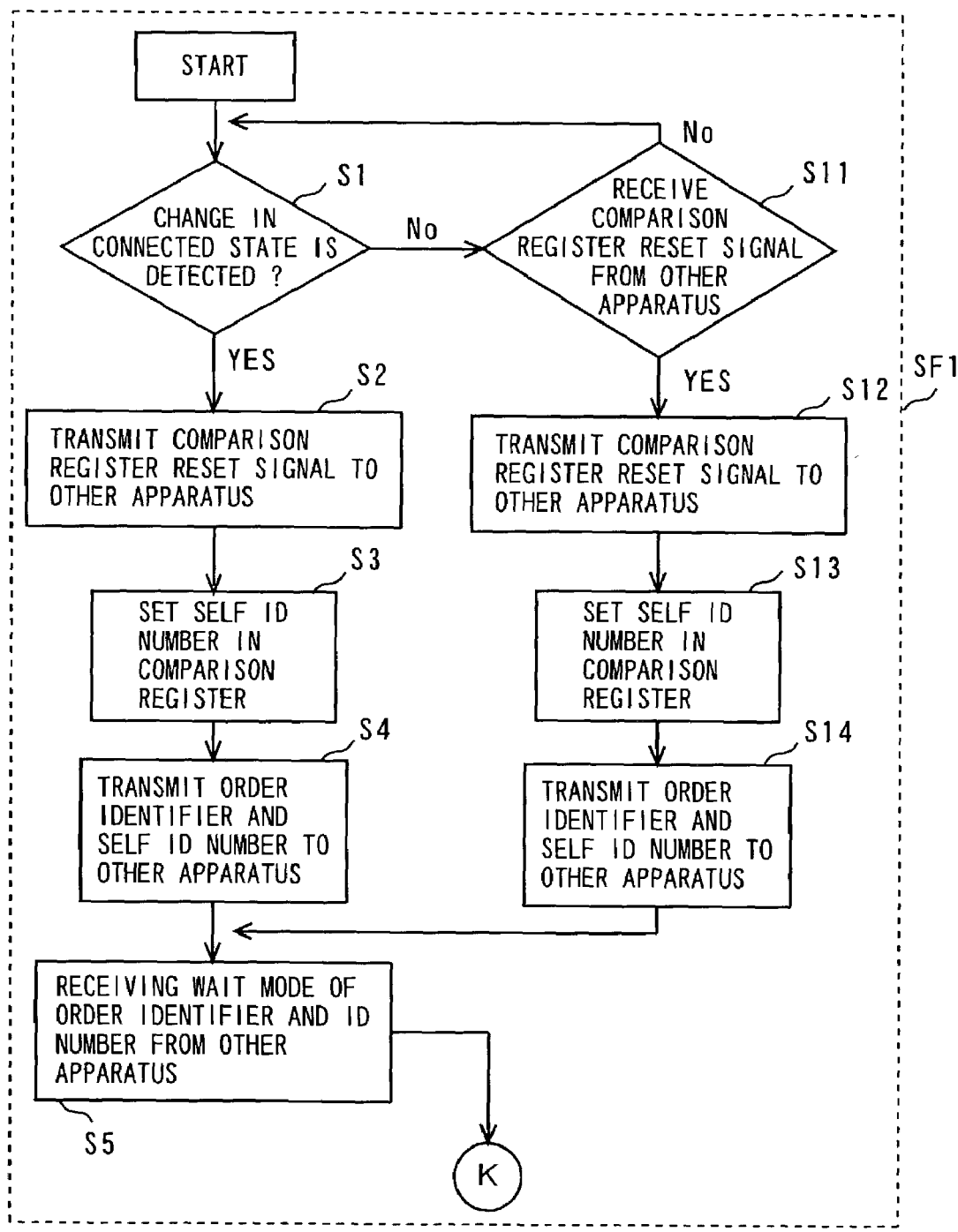
FIG. 6 is a detailed flow chart showing priority determination processing of the electronic apparatuses with the change in the connected state in the first embodiment.
Figure 7:
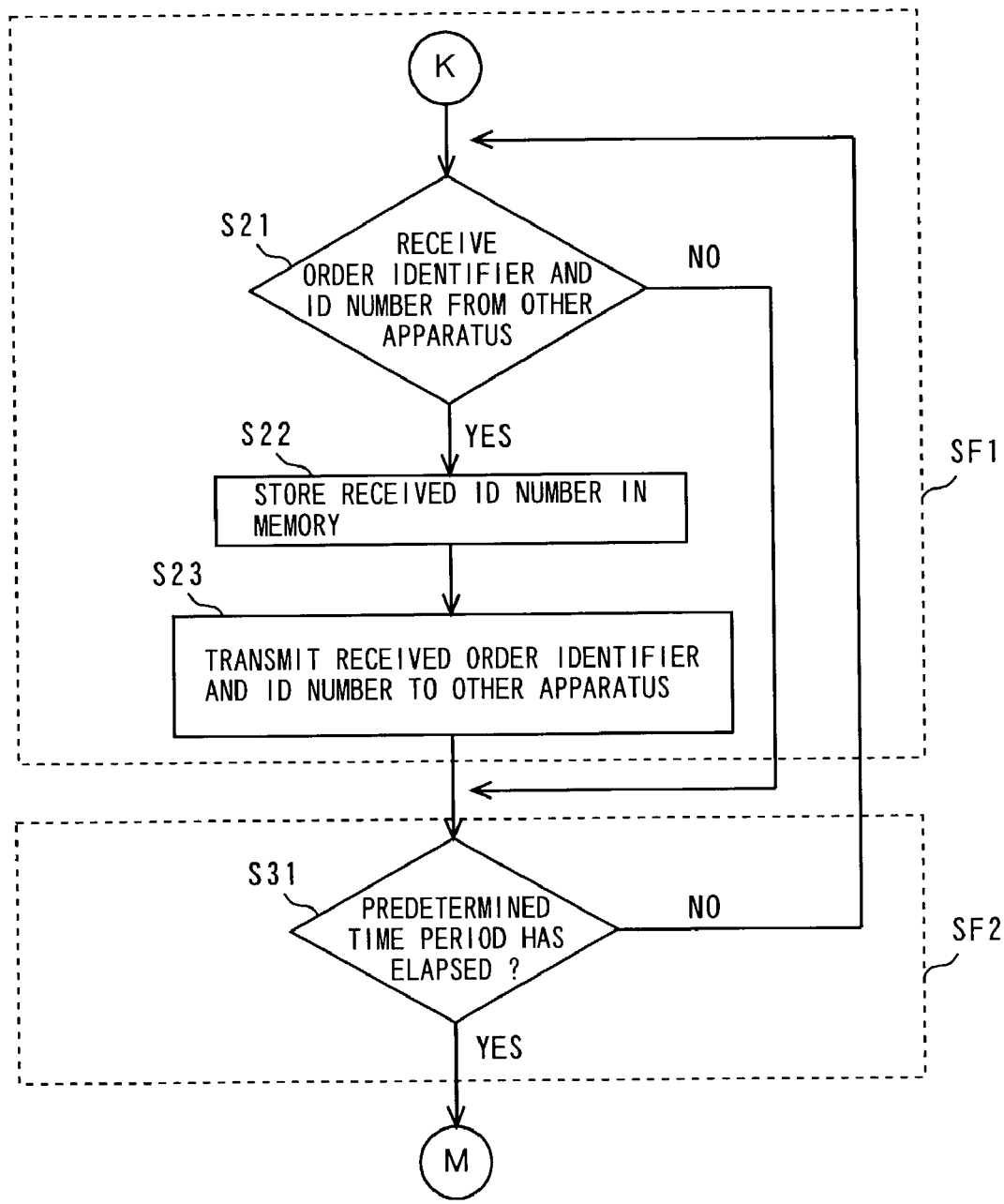
FIG. 7 is a detailed flow chart showing priority determination processing of the electronic apparatuses with the change in the connected state in the first embodiment.
Figure 8:
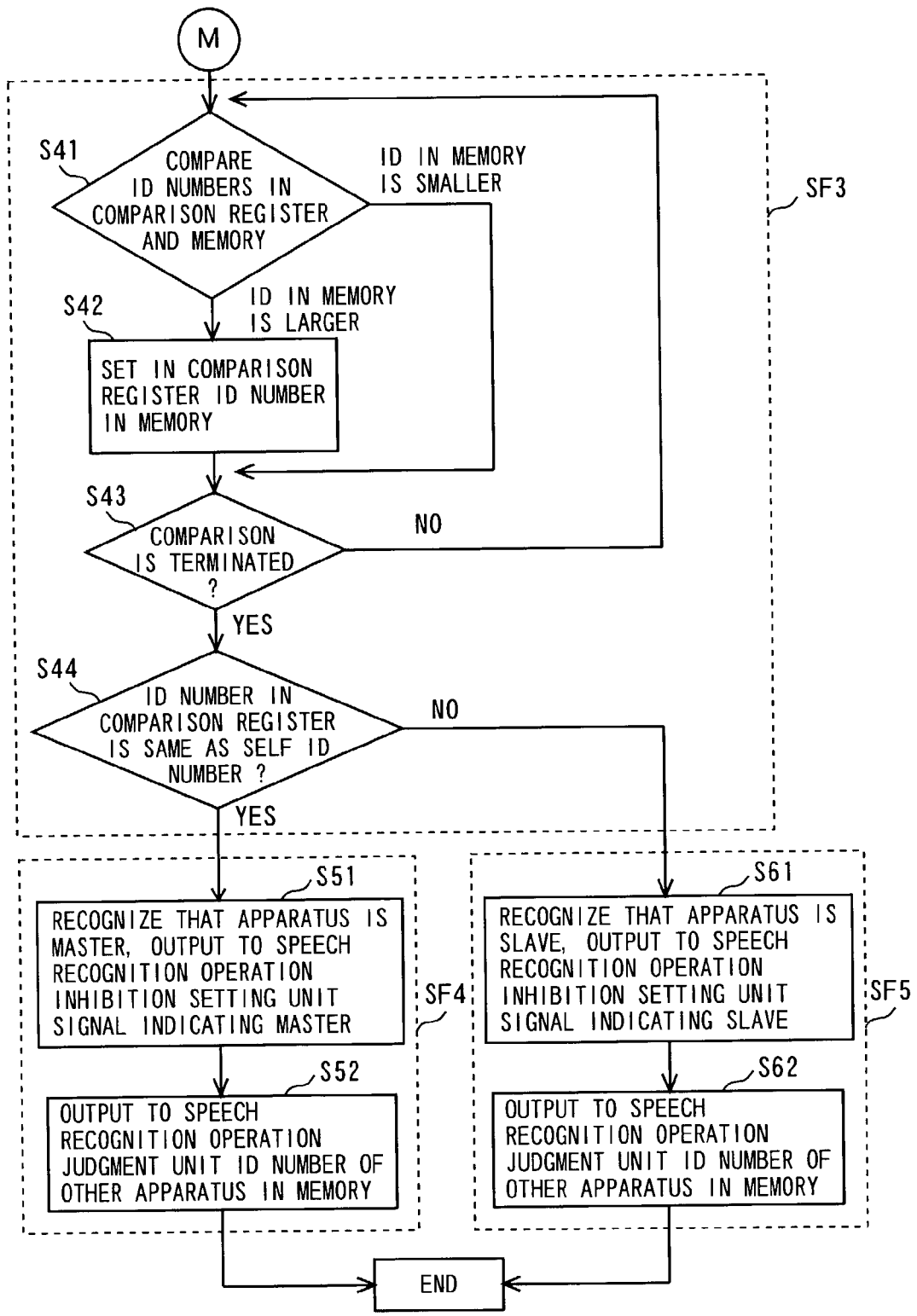
FIG. 8 is a detailed flow chart showing priority determination processing of the electronic apparatuses with the change in the connected state in the first embodiment.

FIGS. 6, 7 and 8 are detailed flow charts showing priority determination processing of the electronic apparatuses with the change in the connected state.

The priority determination processing of the electronic apparatuses will be described separately with respect to a case where a new electronic apparatus is connected and a case where one of electronic apparatuses is non-connected.

It is assumed that ID numbers IDa, IDb, IDc, and IDx are respectively assigned to the apparatuses A, B, C, and X. It is assumed that the priorities of the apparatuses A, B, C, and X are respectively determined by the values of the ID numbers IDa, IDb, IDc, and IDx. In the first embodiment, the values of the ID numbers have the relationship of IDa>IDb>IDc>IDx, and the priorities of the apparatuses A, B, C, and X decrease in this order. A method of determining the priorities of the apparatuses is not limited to the same. For example, the priorities may be determined using a part of an inherent number assigned to each of the apparatuses or on the basis of the results of processing of the whole or a part of the inherent number by an operation or the like.

In the connected state shown in FIG. 4, consider a case where the new electronic apparatus is connected. That is, description is made of a case where the apparatus X is newly connected to the apparatus C in a state where the apparatuses A, B, and C are connected to one another. Here, the apparatus A has the highest priority before the connected state is changed.

The other apparatus X is connected to the input/output interface 802 in the apparatus C, whereby the microcomputer 803 in the communication control unit 103 in the apparatus C detects the change in the connected state (step S1).

Consequently, the microcomputer 803 in the apparatus C transmits a comparison register reset signal to the other apparatuses B and X through the input/output interface 802 (step S2). Here, the comparison register reset signal is a signal for resetting data stored in the comparison register 805 in the communication control unit 103 in each of the apparatuses.

The microcomputer 803 in the apparatus C then sets the self ID number IDc in the self comparison register 805 (step S3). The ID number IDa is set in the comparison register 805 in the apparatus C before the apparatus X is connected because the apparatus A has the highest priority.

Thereafter, the microcomputer 803 in the apparatus C transmits an order identifier and the ID number IDc to the other apparatuses B and X (step S4). Here, the order identifier indicates that an ID number for priority assignment is transmitted. Since the apparatus C is not directly connected to the apparatus A, the apparatus C cannot directly transmit the order identifier and the ID number IDc to the apparatus A.

The apparatus C enters a receiving wait mode of an order identifier and an ID number from the other apparatus (step S5). In the apparatus X, the operations at the steps S1 to S5 are also performed.

The operations of the apparatus B during the operations at the steps S1 to S5 of the apparatus C will be described below.

The apparatus B does not detect, at the time point where the apparatus X is connected to the apparatus C, the change in the connected state (step S1), not to start communication processing. The communication processing of the apparatus B is started by receiving the comparison register reset signal through the input/output interface 802 from the apparatus C (step S11). The microcomputer 803 in the apparatus B resets the self comparison register 805 when it receives the comparison register reset signal.

Furthermore, the microcomputer 803 in the apparatus B transmits the received comparison register reset signal to the other apparatus A through the input/output interface 802 (step S12).

Thereafter, the microcomputer 803 in the apparatus B sets the self ID number IDb in the self comparison register 805 (step S13).

The microcomputer 803 in the apparatus B transmits an order identifier and the self ID number IDb to the other apparatuses A and C through the input/output interface 802 (step S14). Thereafter, the apparatus B enters a receiving wait mode of an order identifier from the other apparatus (step S5). In the apparatus A, the operations at the steps S1, S11 to S14, and S5 are also performed.

The microcomputer 803 in the apparatus C stores, when it receives the order identifiers and the ID numbers IDb and IDx from the other apparatuses B and X through the input/output interface 802 in the receiving wait mode (step S21), the received ID numbers IDb and IDx from the other apparatuses B and X in the memory 804 (step S22).

The microcomputer 803 in the apparatus C transmits the order identifiers and the ID numbers IDb and IDx received from the other apparatuses B and X to the other apparatuses B and X through the input/output interface 802 (step S23).

The foregoing steps S21 to S23 are repeated until a predetermined time period has elapsed (step S31). In this case, the apparatus C can accept the ID number IDa from the apparatus A which is not directly connected thereto through the apparatus B. Consequently, the ID numbers IDa, IDb, and IDx of all the other apparatuses A, B, and X are stored in the memory 804 in the apparatus C.

In the apparatuses A, B, and X, the operations at the steps S21 to S23 are also repeated. Consequently, the ID numbers of all the other apparatuses are respectively stored in the memories 804 in the apparatuses A, B, and X.

The operations at the foregoing steps S1 to S5 and S21 to S23 correspond to communication processing among electronic apparatuses at the step SF1 in the priority determination processing shown in FIG. 3. The step S31 corresponds to the connection apparatus judgment processing at the step SF2 in the priority determination processing shown in FIG. 3.

Although in this example, each of the apparatuses A, B, C, and X first transmits the comparison register reset signal (step S2), sets the self ID number in the comparison register 805 (step S3), transmits the order identifier and the ID number (step S4), and then receives the ID number from the other apparatus, it may, in some cases, receive the ID numbers from the other apparatuses in a case where it sets the self ID number in the comparison register. In this case, the apparatus may perform the operations at the steps S3 and S4 after performing the operations at the steps S21 to S23.

The microcomputer 803 in the apparatus C then successively compares the ID number set in the comparison register 805 with the ID numbers IDa, IDb, and IDx of the other apparatuses A, B, and X stored in the memory 804 (step S41). In the initial state, the self ID number IDc is set in the comparison register 805.

When the ID number in the memory 804 is larger than the ID number in the comparison register 805, the microcomputer 803 in the apparatus C sets in the comparison register 805 the ID number in the memory 804 (step S42). In this example, the ID number IDa is set in place of the ID number IDc in the comparison register 804 in the apparatus C.

When the ID number in the memory 804 is not larger than the ID number in the comparison register 805, the comparison register 805 is not reset.

Until comparison between the ID number set in the comparison register 805 and all the ID numbers IDa, IDb, and IDx stored in the memory 804 is terminated, the operations at the steps S41 to S42 are repeated (step S43).

As a result, the ID number of the electronic apparatus having the highest priority is set in the comparison register 805. In the present embodiment, the apparatus A has the highest priority, so that the ID number IDa of the apparatus A is set in the comparison register 805.

When the comparison between the ID number set in the comparison register 805 and all the ID numbers IDa, IDb, and IDx stored in the memory 804 is terminated, the microcomputer 803 in the apparatus C judges whether or not the comparison register 805 has the same ID number as the self ID number IDc (step S44).

In the apparatuses A, B, and X, the operations at the steps S41 to S44 are also performed. Consequently, the ID number IDa of the apparatus A is set in the comparison registers 805 in the apparatuses A, B, and X.

The operations at the steps S41 to S44 correspond to the priority judgment processing at the step SF3 in the priority determination processing shown in FIG. 3. The processing is retrieval work in the memory 804 having the ID number stored at the step S22.

The microcomputer 803 in the apparatus C then recognizes, when the self ID number IDc is not set in the comparison register 805 at the step S44, that the apparatus itself is a slave, and outputs a signal indicating the slave to the speech recognition operation inhibition setting unit 104 in the apparatus C (step S61).

The microcomputer 803 in the apparatus C then outputs to the speech recognition operation judgment unit 105 the ID numbers IDa, IDb, and IDx of the other apparatuses A, B, and X which are stored in the memories 804 (step S62).

On the other hand, the microcomputer 803 in the apparatus C recognizes, when the self ID number IDc is set in the comparison register 805 at the step S44, that the apparatus itself is a master, and outputs a signal indicating the master to the speech recognition operation inhibition setting unit 104 in the apparatus C (step S51).

The microcomputer 803 in the apparatus C then outputs to the speech recognition operation judgment unit 105 the ID numbers IDa, IDb, and IDx of the other apparatuses A, B, and X which are stored in the memory 804 (step S52).

In this example, the ID number IDa of the apparatus A is set in the comparison register 805 in the apparatus C, whereby it is recognized that the apparatus C is a slave.

In the apparatuses A, B, and X, the operations at the steps S41 to S44, S51, S52, S61, and S62 are also performed. Consequently, it is recognized that the apparatus A is a master, and it is recognized that the apparatuses B and X are slaves.

The operations at the steps S51 and S52 correspond to the setting processing at highest priority at the step SF4 in the priority determination processing shown in FIG. 3. The operations at the steps S61 and S62 correspond to the setting processing at non-highest priority at the step SF5 in the priority determination processing shown in FIG. 3.

By the foregoing, the priority determination processing of each of the electronic apparatuses in a case where the new electronic apparatus is connected is terminated.

Then consider a case where the one electronic apparatus is non-connected in the connected state shown in FIG. 5. That is, description is made of a case where the apparatus X is non-connected from the apparatus C in a state where the apparatuses A, B, C, and X are connected to one another. Here, the apparatus A has the highest priority before the connected state is changed.

The input/output interface 802 in the apparatus X enters a non-connected state from the apparatus C, whereby the microcomputer 803 in the communication control unit 103 in the apparatus X detects the change in the connected state (step S1).

Consequently, the microcomputer 803 in the apparatus X performs an operation for transmitting the comparison register reset signal to the other apparatus through the input/output interface 802 (step S2).

The microcomputer 803 in the apparatus X then sets the self ID number IDx (the ID number IDx of the apparatus X) in the self comparison register 805 (the comparison register 805 in the apparatus X) (step S3). The ID number IDa is set in the comparison register 805 in the apparatus X before it is non-connected from the apparatus C because the apparatus A has the highest priority.

Thereafter, the microcomputer 803 in the apparatus X performs an operation for transmitting the order identifier and the ID number IDx to the other apparatus (step S4).

The apparatus X enters a receiving wait mode of an order identifier and an ID number from the other apparatus (step S5).

The apparatus X is in an independent state. Accordingly, a transmission operation to the other apparatus cannot be performed at the foregoing steps S2 and S4. Therefore, only the steps S1, S3, and S5 are carried out as an actual operation of the apparatus X.

The operations of the apparatus C during the operations at the steps S1 to S5 of the apparatus X will be described below.

The input/output interface 802 in the apparatus C enters a non-connected state form the apparatus X, whereby the microcomputer 803 in the communication control unit 103 in the apparatus C detects the change in the connected state (step S1).

The operations performed after that are the same as those at the steps S2 to S5 in the above-mentioned case where the new electronic apparatus is connected.

The operations of the apparatuses A and B during the operations at the steps S1 to S5 of the apparatus X are the same as those at the steps S1, S11 to S14, and S5 in the above-mentioned case where the new electronic apparatus is connected.

The apparatus X is not connected to the other apparatus. Accordingly, the microcomputer 803 in the apparatus X does not receive the order identifier and the ID number of the other apparatus in the receiving wait mode after the operation at the step S5. Therefore, the apparatus X waits until a predetermined time period has elapsed (step S31).

At this time, the other apparatuses A, B, and C perform the operations at the steps S21 to S23 shown in the above-mentioned case where the new electronic apparatus is connected, to wait until a predetermined time period has elapsed (step S31).

The apparatus X makes priority judgment after the elapse of the predetermined time period at the step S31. That is, the apparatus X compares the self ID number set in the comparison register 805 with the ID number stored in the memory 804 (step S41). Here, no ID number exists in the memory 804 in the apparatus X which does not receive the order identifier and the ID number of the other apparatus. In a state where there is no object to be compared, the comparison operation of the apparatus X is terminated (step S43).

At this time, the self ID number IDx set at the step S3 is set in the comparison register 805 in the apparatus X. The microcomputer 803 in the apparatus X judges that the ID number set in the comparison register 805 is the same as the self ID number IDx (step S44).

At this time, the other apparatuses A, B, and C perform the operations at the steps S41 to S44 shown in the above-mentioned case where the new electronic apparatus is connected. Here, the ID number IDa of the apparatus A is set in each of the comparison registers 805 in the apparatuses A, B, and C at the step S43.

The microcomputer 803 in the apparatus X recognizes that the apparatus itself is a master because the self ID number IDx is set in the comparison register 805 at the step S44, and outputs a signal indicating the master to the speech recognition operation inhibition setting unit 104 in the apparatus X (step S51).

The microcomputer 803 in the apparatus X then performs an operation for outputting to the speech recognition operation judgment unit 105 the ID number in the memory 804. Here, no ID number exists in the memory 804, and no connected electronic apparatus exists. Accordingly, it substantially performs no operations (step S52).

The other apparatus A performs the operations at the steps S51 to S52 shown in the above-mentioned case where the new electronic apparatus is connected. On the other hand, the other apparatuses B and C perform the operations at the steps S61 to S62 shown in the above-mentioned case where the new electronic apparatus is connected.

By the foregoing, the apparatus X and the apparatus A are masters, and the apparatus B and the apparatus C are slaves. Accordingly, the priority determination processing in the case shown in FIG. 5 where the one electronic apparatus is non-connected is terminated.

(Second Embodiment)

Description is now made of a priority determination device in a second embodiment of the present invention.

Figure 9:
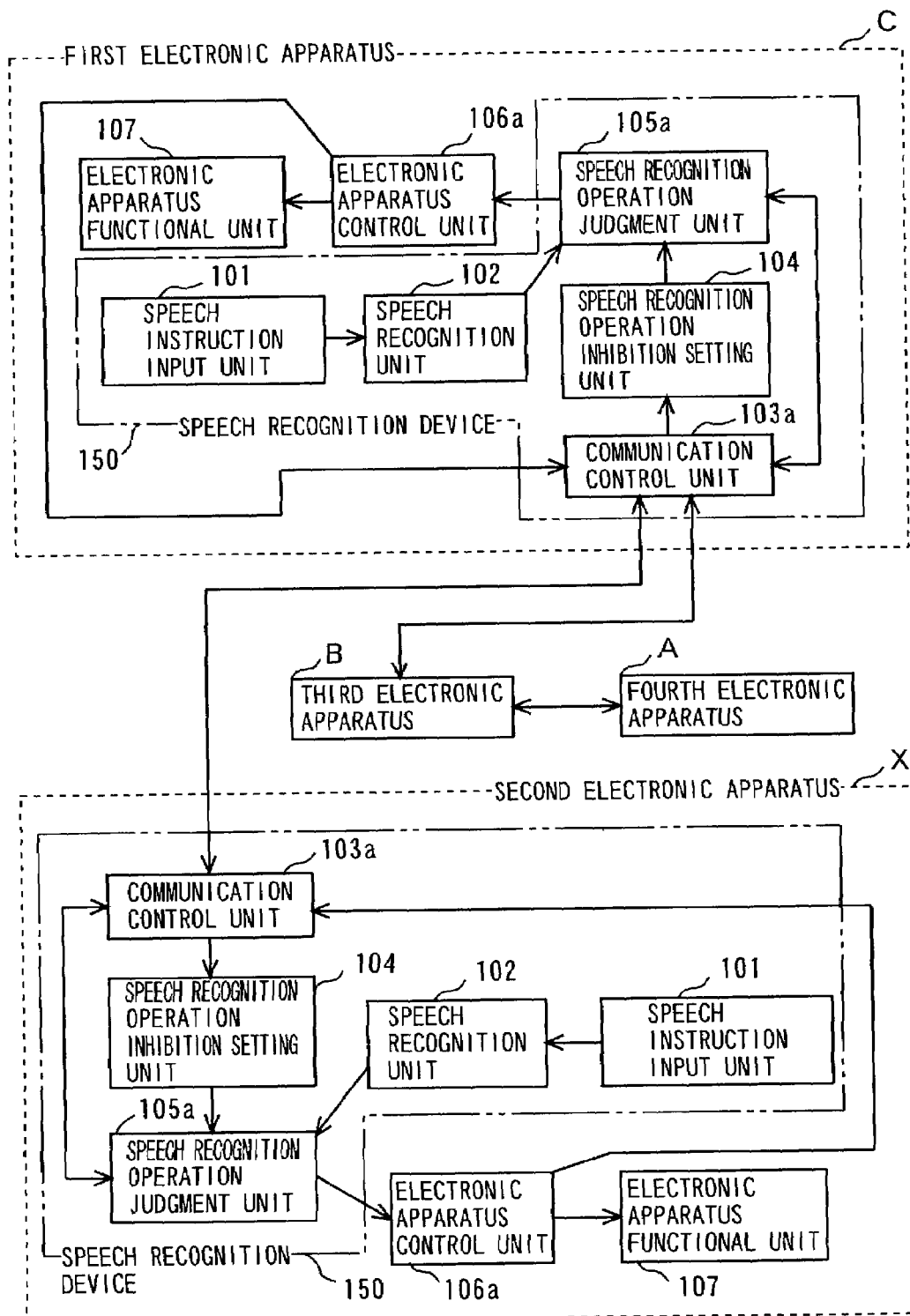
FIG. 9 is a block diagram showing the connection of four types of electronic apparatuses each comprising a priority determination device in a second embodiment.

FIG. 9 is a block diagram showing the connection of four types of electronic apparatuses each comprising a priority determination device in the second embodiment.

In FIG. 9, the configurations of the two types of electronic apparatuses are illustrated. It is assumed that the four electronic apparatuses are arranged near to one another. In the second embodiment, the configurations of the four electronic apparatuses are the same as those in the first embodiment except for parts thereof. The configuration and the operations of the first electronic apparatus C will be described below.

In the second embodiment, an electronic apparatus control unit 106a, a communication control unit 103a, and a speech recognition operation judgment unit 105a are respectively provided in place of the electronic apparatus control unit 106, the communication control unit 103, and the speech recognition operation judgment unit 105 in the first embodiment.

When the apparatus C is so set as to be operated by a speech recognition operation, the speech recognition device 150 outputs a command signal to the electronic apparatus control unit 106a on the basis of a command issued by speech from the exterior. When the apparatus C is so set as not to be operated by the speech recognition operation, the speech recognition device 150 does not output the command signal to the electronic apparatus control unit 106 even when the command is issued by speech.

In the second embodiment, the speech recognition device 150 determines, when it is connected to the other electronic apparatuses, priorities among the connected electronic apparatuses, and performs a speech recognition function when the electronic apparatus provided therewith has the highest priority, as in the first embodiment. Priority determination processing will be described later.

The speech recognition device 150 comprises a speech instruction input unit 101, a speech recognition unit 102, a communication control unit 103a, a speech recognition operation inhibition setting unit 104, and a speech recognition operation judgment unit 105a. In the present embodiment, the communication control unit 103a constitutes a priority determination device.

In the second embodiment, the communication control unit 103a included in the speech recognition device 150 judges the priority and the type of the connected electronic apparatus in response to the change in the states of power supplies in the connected other electronic apparatuses, and performs various types of operations on the basis of the results of the judgment in addition to the operation of the communication control unit 103 in the first embodiment. Here, the other electronic apparatuses are a second electronic apparatus X, a third electronic apparatus B, and a fourth electronic apparatus A. The communication control unit 103a feeds to the speech recognition operation inhibition setting unit 104 information as to whether or not the apparatus C has the highest priority. Further, the communication control unit 103a outputs, in a case where it operates the other apparatuses when it is connected to the other electronic apparatuses, a command signal fed from the speech recognition operation judgment unit 105a to the other apparatuses.

The speech recognition operation judgment unit 105a is composed of a memory and a computer. The memory stores information representing the types of the other electronic apparatuses which are fed by the communication control unit 103a. The microcomputer performs various types of operations on the basis of the information stored in the memory and the information fed from the speech recognition unit 102, the speech recognition operation inhibition setting unit 104, and the communication control unit 103. Consequently, the speech recognition operation judgment unit 105a can operate not only the electronic apparatus provided therewith but also the other electronic apparatuses by the speech recognition operation.

When the speech recognition operation is allowed by the speech recognition operation inhibition setting unit 104, the speech recognition operation judgment unit 105a outputs the command signal to the electronic apparatus control unit 106a on the basis of the command fed by the speech recognition unit 102. Further, the speech recognition operation judgment unit 105 outputs, when it operates the connected other electronic apparatuses, the command signal to the communication control unit 103a on the basis of the command fed by the speech recognition unit 102, and operates the other electronic apparatus through the communication control unit 103a. On the other hand, when the speech recognition operation is inhibited by the speech recognition operation inhibition setting unit 104, the speech recognition operation judgment unit 105a does not output the command signal to the electronic apparatus control unit 106a even if the command is fed by the speech recognition unit 102.

The electronic apparatus control unit 106a receives the command signal by a manual operation or the speech recognition operation of the speech recognition device 150, to control the electronic apparatus functional unit 107. Further, the electronic apparatus control unit 106a transmits, when it receives a command signal for turning on or off a self power supply from the speech recognition operation judgment unit 105a by a manual operation or the speech recognition operation of the speech recognition device 150, a detection signal indicating that the state of the power supply in the apparatus C is changed to the communication control unit 103a. The turn-off of the power supply referred to herein is the turn-off of the power supplied to the electronic apparatus functional unit or the like. It is assumed that the power is supplied to a portion which communicates with the other apparatus, for example, a communication control unit.

Figure 10:
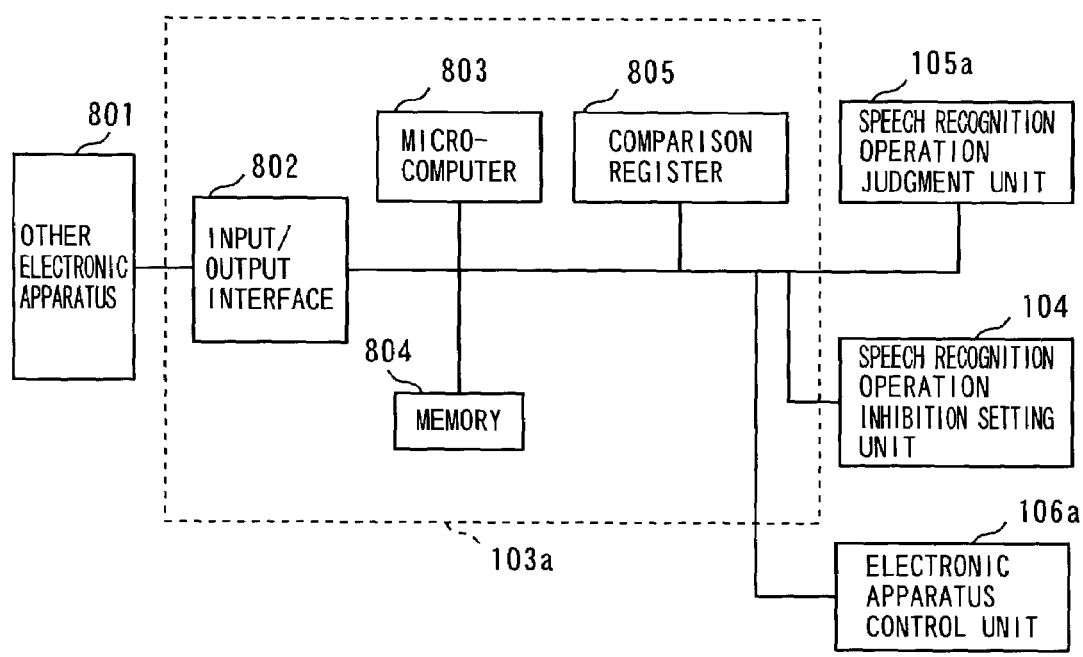
FIG. 10 is a block diagram showing the configuration of a communication control unit in the second embodiment.

FIG. 10 is a block diagram showing the configuration of the communication control unit 103a. The configuration and the operations of the communication control unit 103a in the second embodiment will be described on the basis of FIG. 10.

The communication control unit 103a comprises an input/output interface 802, a microcomputer 803, a memory 804, and a comparison register 805.

The input/output interface 802 is connected to the other electronic apparatus 801 by a cable, infrared communication, etc. The input/output interface 802 receives, when the state of a power supply in the connected other electronic apparatus is changed, a signal indicating that the state of the power supply in the other electronic apparatus is changed, and outputs the signal to the microcomputer 803. Here, the other electronic apparatus 801 corresponds to the second electronic apparatus X, the third electronic apparatus B, and the fourth electronic apparatus A shown in FIG. 9.

The microcomputer 803 performs various types of processing in response to the change in the states of the power supplies in the other electronic apparatus 801 and the electronic apparatus provided therewith. The memory in the microcomputer 803 stores a priority determination program for performing priority determination processing shown in FIGS. 14 to 17. The priority determination program in the microcomputer 803 executes the priority determination program stored in the memory in the microcomputer 803, to perform the priority determination processing.

The memory 804 stores an ID (identification) number transmitted from the other electronic apparatus 801. The comparison register 805 is used for comparing the priorities of ID numbers.

The configuration and the operations of the second electronic apparatus X (hereinafter referred to as the apparatus X) are the same as the configuration and the operations of the apparatus C. The function of an electronic apparatus functional unit 107 in the apparatus X differs from the function of the electronic apparatus functional unit 107 in the apparatus C.

The configurations and the operations of the third electronic apparatus B (hereinafter referred to as the apparatus B) and the fourth electronic apparatus A (hereinafter referred to as the apparatus A) are the same as the configuration and the operations of the apparatus C. However, the functions of electronic apparatus functional units 107 in the apparatuses B and A differ from the functions of the electronic apparatus functional units 107 in the apparatuses C and X.

Here, the outline of the flow of processing related to the recognition of the states of power supplies and the judgment of priorities will be described using FIG. 11.

Figure 11:
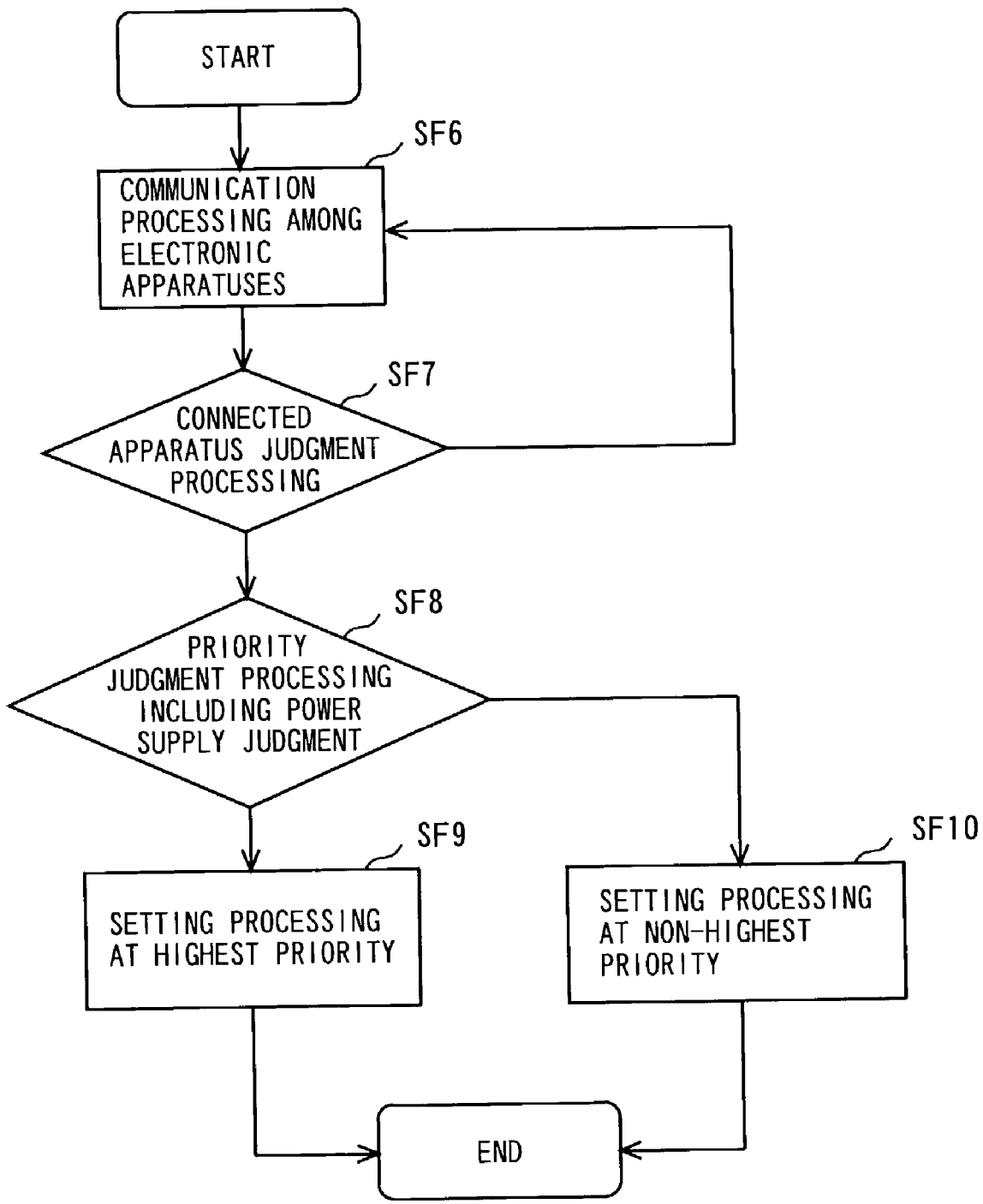
FIG. 11 is a diagram showing the outline of the flow of processing related to the recognition of the states of power supplies and the judgment of priorities in the second embodiment.

FIG. 11 is a flow chart showing priority determination processing in a case where the states of power supplies in the electronic apparatuses shown in FIG. 9 are changed. The outline of the flow, described below, is applied to all changes in the states of the power supplies among the electronic apparatuses.

First, communication processing is automatically started among the electronic apparatuses which are connected to one another as the states of the power supplies are changed (step SF6). Consequently, mutual communication is established with respect to information representing the priorities for speech recognition, information representing the types of the connected electronic apparatuses, and information representing the states of the power supplies.

Each of the electronic apparatuses judges whether or not any one of the other electronic apparatuses must sill communicate therewith (step SF7). Communication is established among all the connected electronic apparatuses by the communication processing among electronic apparatuses at the step SF6 and the connected apparatus judgment processing at the step SF7. Accordingly, each of the electronic apparatuses receives the information representing the priorities for speech recognition from the other electronic apparatuses, the information representing the types of the connected other electronic apparatuses, and the information representing the states of the power supplies.

Thereafter, each of the electronic apparatuses judges the priority on the basis of the information received at the step SF6 and SF7 (step SF8). Here, the electronic apparatus judges whether or not the apparatus itself has the highest priority. Consequently, the plurality of electronic apparatuses which are connected to one another are classified into the one electronic apparatus having the highest priority and the other electronic apparatuses having the non-highest priority.

The electronic apparatus having the highest priority then performs setting processing at highest priority (step SF9). In this case, the communication control unit 103a outputs information representing the highest priority to the speech recognition operation inhibition setting unit 104, and outputs the information representing the types of the connected other electronic apparatuses to the speech recognition operation judgment unit 105a. Consequently, the speech recognition operation inhibition setting unit 104 allows the speech recognition operation judgment unit 105a to perform the speech recognition operation by the speech instruction input unit 101 and the speech recognition unit 102.

On the other hand, the electronic apparatus having the non-highest priority performs setting processing at non-highest priority (step SF10). In this case, the communication control unit 103a outputs information representing the non-highest priority to the speech recognition operation inhibition setting unit 104, and outputs the information representing the types of the connected other electronic apparatuses to the speech recognition operation judgment unit 105a. Consequently, the speech recognition operation inhibition setting unit 104 inhibits the speech recognition operation judgment unit 105a from performing the speech recognition operation by the speech instruction input unit 101 and the speech recognition unit 102.

In the following description, the electronic apparatus having the highest priority out of the electronic apparatuses which are connected to one another is referred to as a master, and the electronic apparatus having the non-highest priority is referred to as a slave.

Figure 12:
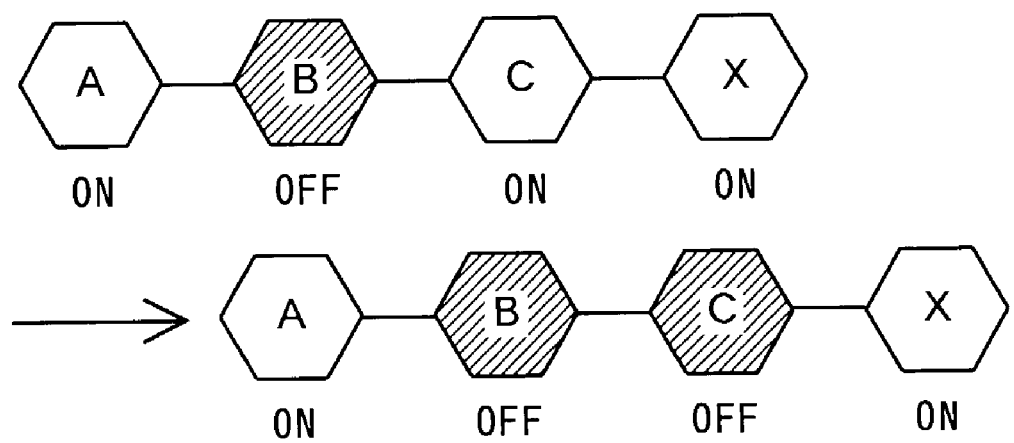
FIG. 12 is a schematic view showing the change in the state of the power supply in each of the four types of electronic apparatuses among the electronic apparatuses in the second embodiment.
Figure 13:
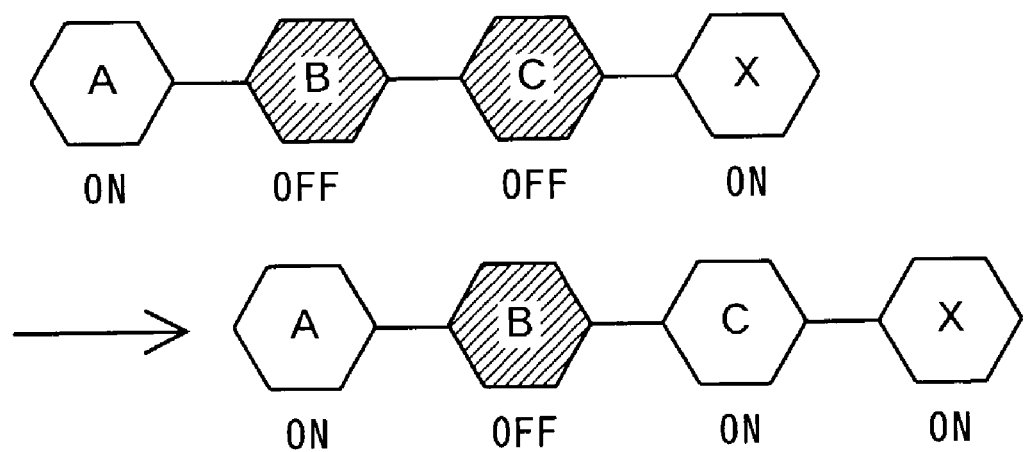
FIG. 13 is a schematic view showing the change in the state of the power supply in each of the four types of electronic apparatuses among the electronic apparatuses in the second embodiment.
Figure 14:
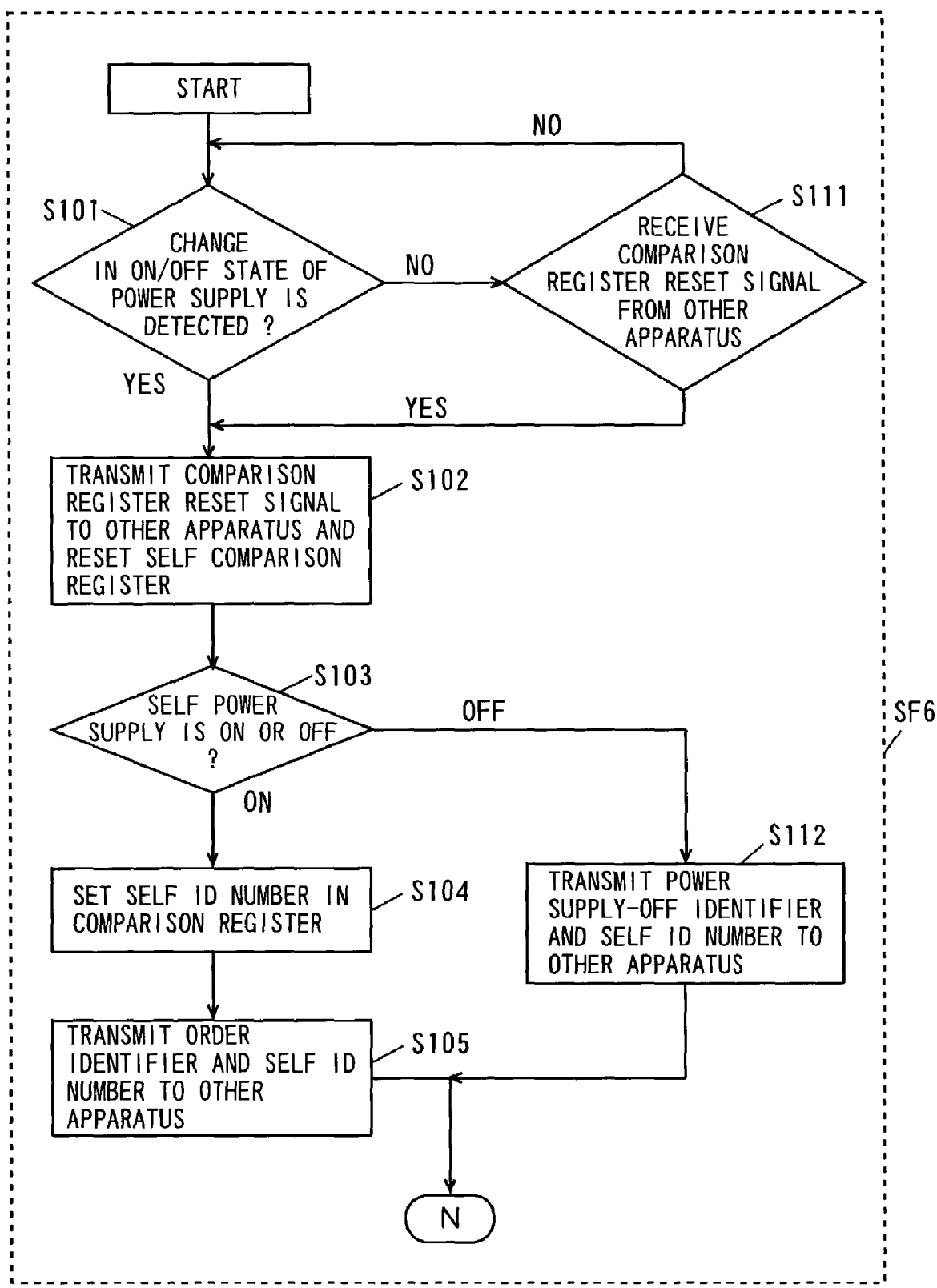
FIG. 14 is a detailed flow chart showing priority determination processing of the connected electronic apparatuses with the change in the states of the power supplies in the electronic apparatuses in the second embodiment.
Figure 15:
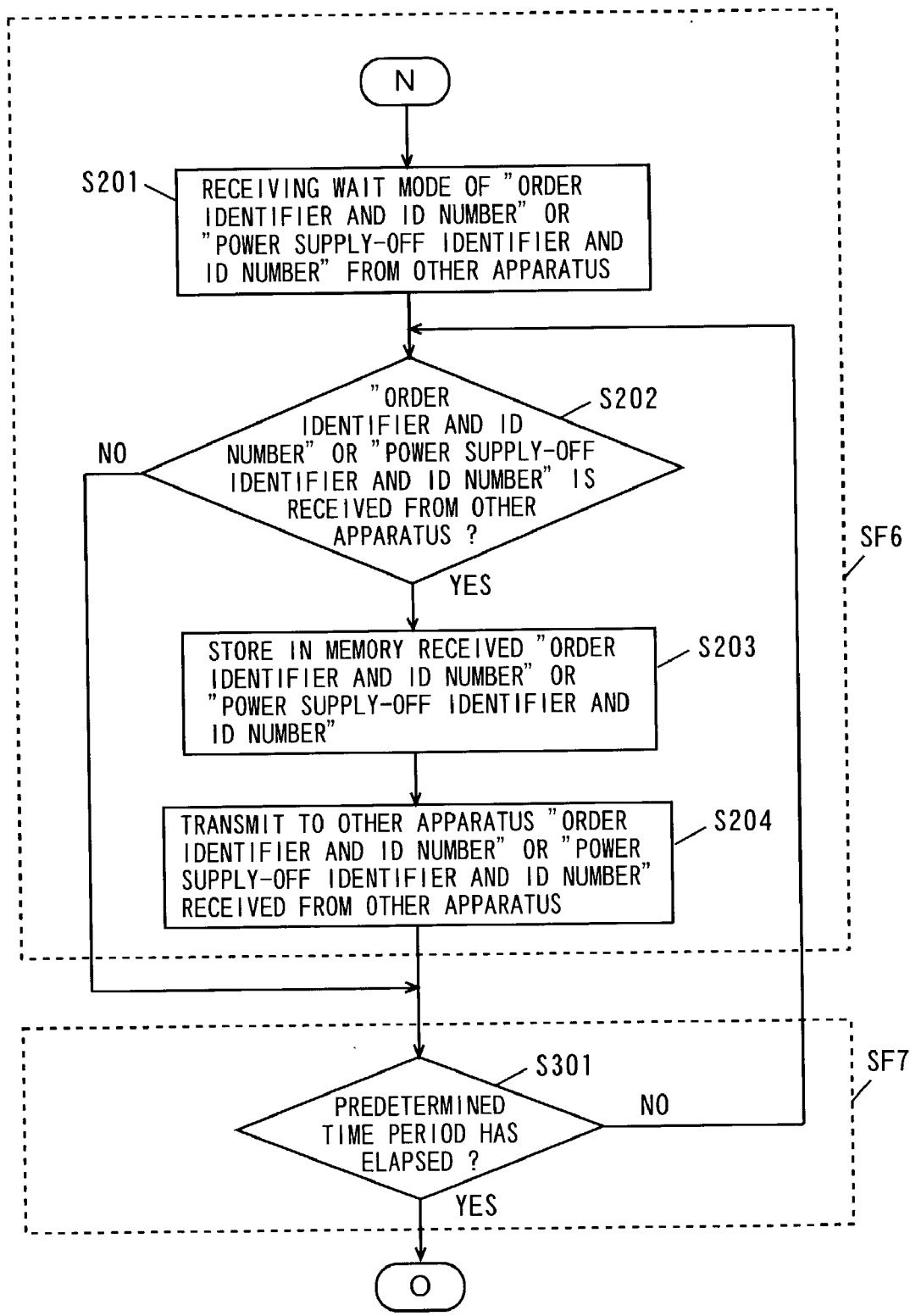
FIG. 15 is a detailed flow chart showing priority determination processing of the connected electronic apparatuses with the change in the states of the power supplies in the electronic apparatuses in the second embodiment.
Figure 16:
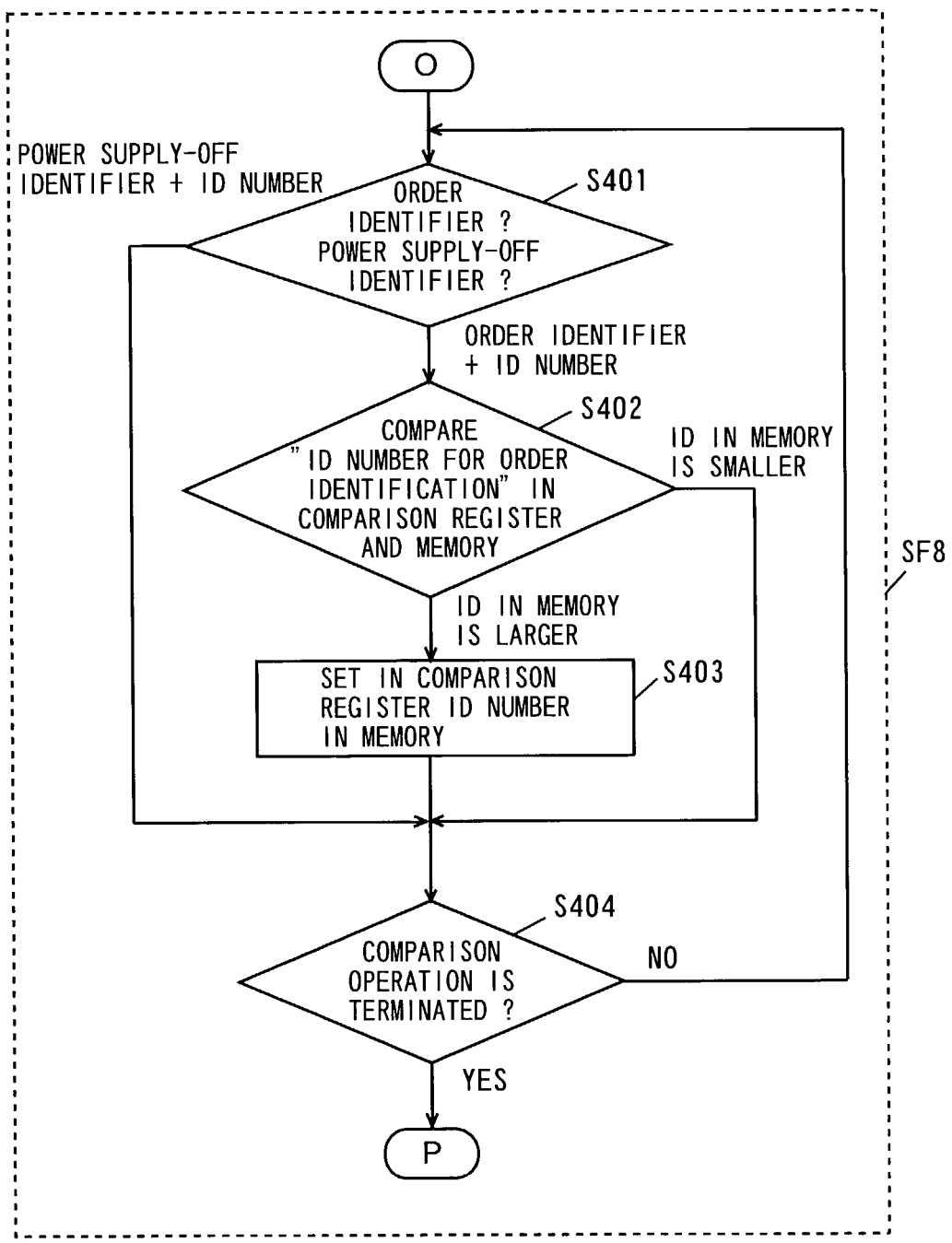
FIG. 16 is a detailed flow chart showing priority determination processing of the connected electronic apparatuses with the change in the states of the power supplies in the electronic apparatuses in the second embodiment.
Figure 17:
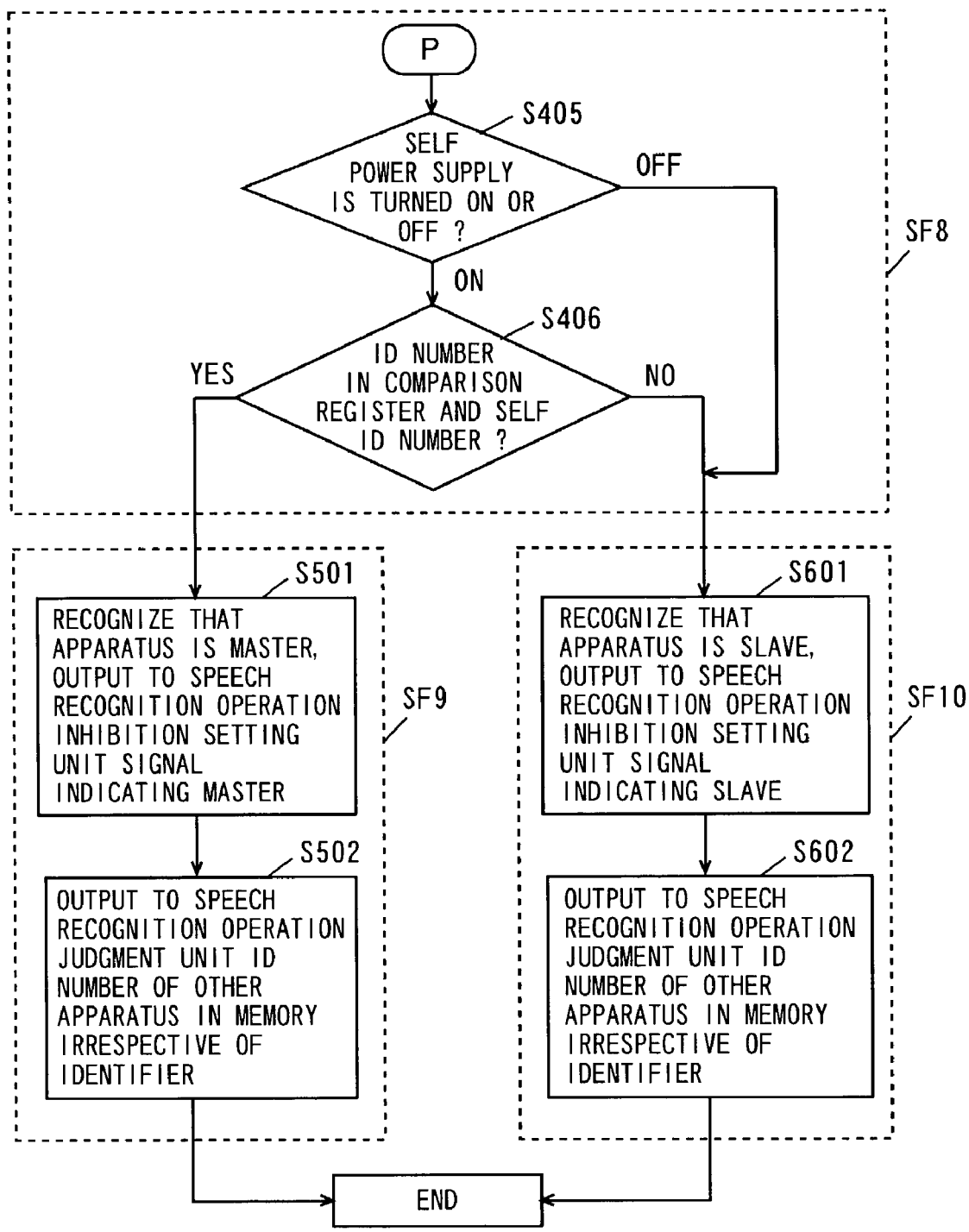
FIG. 17 is a detailed flow chart showing priority determination processing of the connected electronic apparatuses with the change in the states of the power supplies in the electronic apparatuses in the second embodiment.
Figure 18:
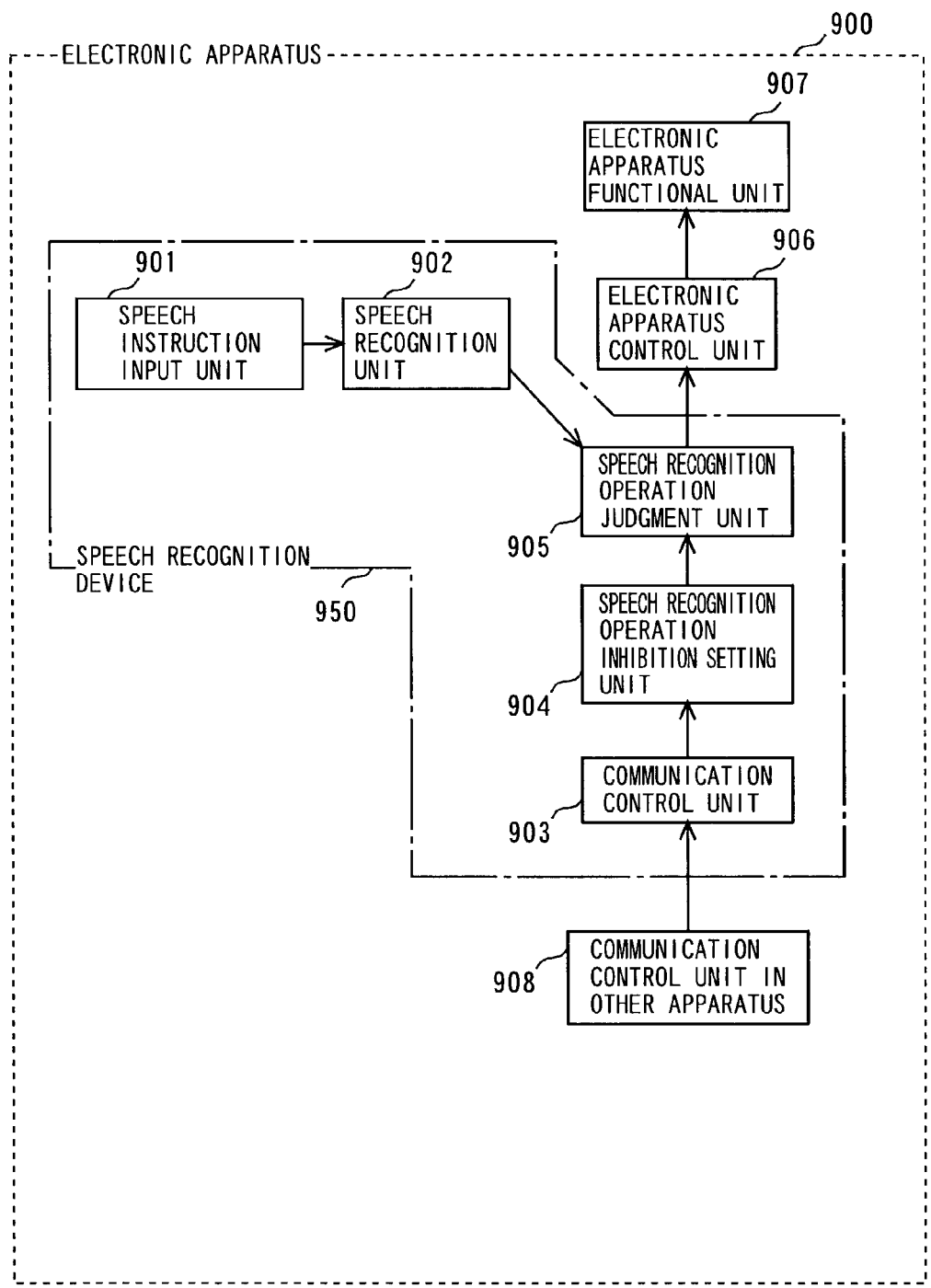
FIG. 18 is a block diagram showing the configuration of a conventional electronic apparatus equipped with a speech recognition device in the second embodiment.

FIGS. 12 and 13 are schematic views showing the change in the state of the power supply in each of the four types of electronic apparatuses shown in FIG. 9. FIG. 12 illustrates a case where the apparatus A, the apparatus B, the apparatus C, and the apparatus X are connected to one another, and a state where the power supply in only the apparatus B is off is changed to a state where the power supply in the apparatus C is further turned off. FIG. 13 illustrates a case where the apparatus A, the apparatus B, the apparatus C, and the apparatus X are connected to one another, and a state where the power supplies in the apparatus B and the apparatus C are off is changed to a state where the power supply in the apparatus C is turned on.

FIGS. 14, 15, 16, and 17 are detailed flow charts showing priority determination processing of the electronic apparatuses with the change in the states of the power supplies.

The priority determination processing of the electronic apparatuses will be described separately with respect to a case where the power supply in one of the connected electronic apparatuses is turned off and a case where the power supply in one of the connected electronic apparatuses is turned on.

It is assumed that ID numbers IDa, IDb, IDc, and IDx are respectively assigned to the apparatuses A, B, C, and X. The priorities of the apparatuses A, B, C, and X are respectively determined by the values of the ID numbers IDa, IDb, IDc, and IDx. In the following example, it is assumed that when the power supplies in all the apparatuses are turned on, the values of the ID numbers have the relationship of IDc>IDb>IDx>IDa, and the priorities of the apparatuses C, B, X, and A decrease in this order.

In the connected state shown in FIG. 12, consider a case where the power supply in one of the connected electronic apparatuses is turned off. That is, description is made of a case where the apparatuses A, B, C, and X are connected to one another, and a state where the power supply in only the apparatus B is off is changed to a state where the power supply in the apparatus C is further turned off. Here, the apparatus C has the highest priority before the states of the power supplies in the connected electronic apparatuses are changed. In this case, the power supply in the apparatus B is turned off, so that the priorities of the apparatuses C, X, and A decrease in this order.

The apparatus C itself has the highest priority, and is allowed to perform a speech recognition operation. A command to turn off the power supply in the apparatus C is given to the speech recognition unit 102 in the apparatus C, whereby the speech recognition unit 102 outputs to the speech recognition operation judgment unit 105a a signal indicating that the self power supply is turned off. The speech recognition operation judgment unit 105a transmits a signal indicating that the power supply in the apparatus C is turned off to the microcomputer 803 in the communication control unit 103a through the electronic apparatus control unit 106a. The microcomputer 803 in the communication control unit 103a in the apparatus C receives a signal indicating that the power supply in the apparatus C is turned off, to detect that the self power supply is turned off (step S101).

At the step S101, the electronic apparatus control unit 106a transmits a signal indicating that the power supply in the apparatus C is turned off to the microcomputer 803 in the communication control unit 103a and at the same time, turns off the power supply in the electronic apparatus functional unit 107. Consequently, the electronic apparatus functional unit 107 stops the inherent function of the apparatus C.

The microcomputer 803 in the apparatus C then transmits a comparison register reset signal to the other apparatuses B and X through the input/output interface 802, and resets the self comparison register (step S102). Here, the comparison register reset signal is a signal for resetting data stored in the comparison register 805 in the communication control unit 103a in each of the apparatuses, as in the first embodiment.

The microcomputer 803 in the apparatus C then judges whether the self power supply is turned on or off (step S103). Here, the power supply in the apparatus C is in the off state.

In this case, the microcomputer 803 in the apparatus C transmits a power supply-off identifier and the self ID number IDc to the other apparatuses B and X without setting the self ID number IDc in the reset self comparison register 805 (step S112).

Before the power supply in the apparatus C is turned off, the apparatus C has the highest priority. Accordingly, the ID number IDc is set in the comparison register 805 in the apparatus C. The power supply-off identifier indicates that the power supply is turned off in a state where the electronic apparatus is connected. In this case, the apparatus C is not directly connected to the apparatus A. Accordingly, the apparatus C cannot transmit the power supply-off identifier and the ID number IDc to the apparatus A.

The apparatus C enters a receiving wait mode of an order identifier and an ID number from the other apparatus (step S201). The order identifier is the same as the order identifier described in the first embodiment.

The operations of the apparatus B during the operations at the steps S101 to 103, the step S112, and the step S201 of the apparatus C will be described below.

At the time point where the power supply in the apparatus C is turned off, the apparatus B does not detect the change in the state of the power supply (step S101), not to start communication processing. Communication processing of the apparatus B is started by receiving the comparison register reset signal through the input/output interface 802 from the apparatus C (step S111).

The microcomputer 803 in the apparatus B receives a comparison register reset signal, to further transmit the comparison register reset signal received through the input/output interface 802 to the other apparatus A as well as to reset the self comparison register 805 (step S102).

The microcomputer 803 in the apparatus B then judges whether the self power supply is turned on or off (step S103). Here, the power supply in the apparatus B is in the off state.

The microcomputer 803 in the apparatus B transmits a power supply-off identifier and the self ID number IDb to the other apparatuses A and C without setting the self ID number IDc to the reset self comparison register (step S112).

Before the power supply in the apparatus C is turned off, the power supply in the apparatus B is also turned off, whereby the ID number is not set in the comparison register 805 in the apparatus B. In this case, the apparatus B is not directly connected to the apparatus X. Accordingly, the apparatus B cannot transmit the power supply-off identifier and the ID number IDb to the apparatus X.

The apparatus B enters a receiving wait mode of an order identifier and an ID number from the other apparatus (step S201).

The operations of the apparatus X during the operations at the steps S101 to S103, the step S112, and the step S201 of the apparatus C will be described below.

At the time point where the power supply in the apparatus C is turned off, the apparatus X does not detect the change in the state of the power supply (step S1), not to start communication processing. Communication processing of the apparatus X is started by receiving the comparison register reset signal through the input/output interface 802 from the apparatus C (step S111).

The microcomputer 803 in the apparatus X receives a comparison register reset signal, to further transmit the comparison register reset signal received through the input/output interface 802 to the other apparatus A as well as to reset the self comparison register 805 (step S102).

The microcomputer 803 in the apparatus X then judges whether the self power supply is turned on or off (step S103). Here, the power supply in the apparatus X is in the on state.

The microcomputer 803 in the apparatus X sets the self ID number IDx in the comparison register 805 (step 104). Before the power supply in the apparatus C is turned off, the apparatus C has the higher priority. Accordingly, the ID number IDc is set in the comparison register 805 in the apparatus X.

The microcomputer 803 in the apparatus X transmits an order identifier and the self ID number IDx to the other apparatus C through the input/output interface 802 (step S105). Thereafter, the apparatus X enters a receiving wait mode of an order identifier from the other apparatus (step S201).

The operations of the apparatus A during the operations at the steps S101 to S103, the step S112, and the step S201 of the apparatus C are the same as the operations of the apparatus X.

The microcomputer 803 in the apparatus C receives the power supply-off identifier and the ID number IDb and the order identifier and the ID number IDx, respectively, from the other apparatuses B and X through the input/output interface 802 in the receiving wait mode (step S202). Consequently, the microcomputer 803 in the apparatus C stores in the memory 804 the power supply-off identifier and the ID number IDb and the order identifier and the ID number IDx which have been respectively received form the apparatuses B and X (step S203). At this time, a combination of the power supply-off identifier and the ID number and a combination of the order identifier and the ID number are also stored in the memory 804.

The microcomputer 803 in the apparatus C transmits the power supply-off identifier and the ID number IDb and the order identifier and the ID number IDx which have been respectively received from the apparatuses B and X to the other apparatuses B and X through the input/output interface 802 (step S204).

The operations at the steps S202 to S204 of the apparatus C are repeated until a predetermined time period has elapsed (step S301). In this case, the apparatus C can receive the ID number IDa from the apparatus A which is not directly connected thereto, together with the order identifier, through the apparatus B. Consequently, the ID numbers IDa, IDb, and IDx of all the other apparatuses A, B, and X and identifiers (a power supply-off identifier and an order identifier) representing the state of the power supply in each of the apparatuses A, B, and X are stored in the memory 804 in the apparatus C.

Also in the apparatuses A, B, and X, the operations at the steps S202 to S204 and the step S301 are repeated. Consequently, stored in the memories 804 in the apparatuses A, B, and X are respectively the ID numbers of all the other apparatuses.

The operations at the foregoing steps S101 to S105, S201 to S204, S111, and S112 correspond to the communication processing among electronic apparatuses at the step SF6 in the priority determination processing shown in FIG. 11. Further, the step S301 corresponds to the connected apparatus judgment processing at the step SF7 in the priority determination processing shown in FIG. 11.

Although each of the apparatuses A, B, C, and X transmits the comparison register reset signal when the power supply is turned on (step S102), sets the self ID number in the comparison register 805 (step S104), transmits the order identifier and the ID number (step S105), and then receives the ID number from the other apparatus, it may receive the identifier and the ID number from the other apparatus when the self ID number is set in the comparison register 805. In this case, the apparatus may perform the operations at the steps S104 and S105 after performing the operations at the steps S202 to S204.

The microcomputer 803 in the apparatus C then judges whether the identifier combined with each of the ID numbers IDa, IDb, and IDx of the other apparatuses A, B, and X which are stored in the self memory 804 is an order identifier or a power supply-off identifier (step S401).

With respect to the apparatuses A and X in a state where the power supplies are on, the order identifiers are respectively combined with the ID numbers IDa and IDx. The microcomputer 803 in the apparatus C judges, when the order identifier is combined with the ID number, that the ID number is an object to be compared. With respect to the apparatus B in a state where the power supply is off, the power supply-off identifier is combined with the ID number IDb. The microcomputer 803 in the apparatus C judges, when the power supply-off identifier is combined with the ID number, that the ID number is not an object to be compared.

Then, the microcomputer 803 in the apparatus C successively compares the ID number set in the self comparison register 805 with the ID numbers IDa, IDb, and IDx of the other apparatuses A, B, and X which are stored in the memory 804 (step S402). With respect to the apparatus B, the power supply-off identifier is combined with the ID number IDb at the step S401, whereby the ID number is outside an object to be compared. Further, the apparatus C is in a state where the power supply is off, whereby the ID number is not set in the comparison register 805 in the apparatus C by the operations at the steps S102 and S112.

A comparison operation described herein is performed in the following manner. When the ID number which is an object to be compared in the memory 804 is larger than the ID number in the comparison register 805, the microcomputer 803 in the apparatus C judges that the ID number in the memory 804 has a high priority. When the ID number in the memory 804 is not larger than the ID number in the comparison register 805, the comparison register 805 is not reset.

The microcomputer 803 in the apparatus C sets in the comparison register 805 the ID number which is judged to have a high priority in the memory 804 (step S403).

This operation is performed successively with respect to all the ID numbers, which are objects to be compared, stored in the memory 804. All the ID numbers, which are objects to be compared, stored in the memory 804 are compared with each other, thereby terminating the comparison operation (step S404).

In the apparatus C, the self ID number is not set in the comparison register 805. When the ID number which is an object to be compared exists in the memory 804, the ID number is set in the comparison register 805.

In this example, the ID number IDa of the apparatus A and the ID number IDx of the apparatus X are set in the memory 804 in the apparatus C. The ID numbers IDa and IDx are successively compared with the ID number in the comparison register 805. In a state where the power supply is on, the priority of the apparatus X is higher than the priority of the apparatus A. Therefore, the ID number IDx of the apparatus X is finally set in the comparison register 805 in the apparatus C.

In the other apparatuses A, B, and X, the operations at the steps S401 to S404 are also performed. Consequently, the ID number IDx of the apparatus X is set in the comparison registers 805 in the apparatuses A, B, and X.

After the foregoing operation work is terminated, an operation for judging whether the apparatus C is a master or a slave is performed.

When the comparison operation is terminated, the microcomputer 803 in each of the apparatuses B, C, A, and X recognizes again whether the self power supply is turned on or off (step S405). In this example, the power supplies in the apparatuses B and C are turned off, and the power supplies in the apparatuses A and X are turned on.

When the self power supply is turned on, the microcomputer 803 then judges whether or not the ID number set in the self comparison register 805 is the same as the self ID number (step S406). In this example, in the apparatuses A and X, the judgment operation is performed.

The operations at the steps S401 to S406 correspond to the priority judgment processing at the step SF8 in the priority determination processing shown in FIG. 11. This processing is retrieval work in the memory 804 having the ID number stored at the step S202.

When the self power supply is turned off at the step S405, the microcomputer 803 recognizes that the apparatus provided therewith is a slave, and outputs a signal indicating the slave to the speech recognition operation inhibition setting unit 104 in the apparatus C (step S601).

The microcomputer 803 then outputs to the speech recognition operation judgment unit 105 the ID numbers IDa, IDb, and IDx of the other apparatuses A, B, and X stored in the memory 804 (step S602). In this example, the apparatus B and the apparatus C in a state where the power supplies are off are respectively slaves.

On the other hand, the power supplies in the apparatuses A and X are in the on state in this example. In this case, the ID number IDx is set in the comparison registers 805 in the apparatuses A and X.

The operations of the apparatus X will be described.

The microcomputer 803 recognizes that the apparatus provided therewith is a master because the self ID number IDx is set in the comparison register 805 at the step S405, and outputs a signal indicating the master to the speech recognition operation inhibition setting unit 104 in the apparatus X (step S501).

The microcomputer 803 in the apparatus X then outputs to the speech recognition operation judgment unit 105 the ID numbers IDa, IDb, and IDc of the other apparatuses A, B, and C which are stored in the memory 804 (step S502).

In this example, the apparatus X becomes a master because the ID number IDx is set in the self comparison register 805. Here, the self ID number IDa is not set in the comparison register 805 in the apparatus A. In this case, the microcomputer 803 in the apparatus A recognizes that the apparatus itself is a slave. The operations at the steps S601 and S602 are performed, as in the apparatus C and the apparatus B.

The operations at the steps S501 and S502 correspond to the setting processing at highest priority at the step SF9 in the priority determination processing shown in FIG. 11. The operations at the steps S601 and S602 correspond to the setting processing at non-highest priority at the step SF10 in the priority determination processing shown in FIG. 11.

By the foregoing, the priority determination processing of each of the connected electronic apparatuses in a case where the state of the power supply in the electronic apparatus is changed in FIG. 12 is terminated.

In the connected state shown in FIG. 13, then consider a case where the power supply in one of the connected electronic apparatuses is turned on. That is, description is made of a case where the apparatuses A, B, C, and X are connected to one another, and a state where the power supplies in the apparatuses B and C are off is changed to a state where the power supply in the apparatus C is turned on.

Here, the apparatus X has the highest priority before the states of the power supplies in the connected electronic apparatuses are changed. In this case, the power supplies in the apparatus B and the apparatus C are turned off, so that the priorities of the apparatuses X and A decrease in this order.

The apparatus C itself has the non-highest priority, and is not allowed to perform a speech recognition operation. In this case, the apparatus X has the highest priority, and is allowed to perform a speech recognition operation.

A command to turn on the power supply in the apparatus C is given to the speech recognition unit 102 in the apparatus X, whereby the speech recognition unit 102 outputs to the speech recognition operation judgment unit 105a a signal indicating that the power supply in the apparatus C is turned on. The speech recognition operation judgment unit 105a transmits a signal indicating that the power supply in the apparatus C is turned on to the communication control unit 103a through the electronic apparatus control unit 106a. The communication control unit 103a in the apparatus X transmits a received command signal to the apparatus C through the input/output interface 802. The apparatus C which has received the command signal starts various types of operations by a command from the exterior.

The signal indicating that the power supply in the apparatus C is turned on is outputted to the electronic apparatus control unit 106a from the communication control unit 103a in the apparatus C through the speech recognition operation judgment unit 105a. The electronic apparatus control unit 106a in the apparatus C turns on the power supply in the electronic apparatus functional unit 107.

On the other hand, the microcomputer 803 in the communication control unit 103a in the apparatus C receives a signal indicating that the power supply in the apparatus C is turned on, to detect that the self power supply is turned on (step S101).

Thereafter, the priority determination processing of the connected electronic apparatuses with the change in the states of the power supplies in the electronic apparatuses are performed, as in the foregoing steps S101 to S105, S111, S112, S201 to S204, S301, S405, S406, S501, S502, S601, and S602.

As a result of the priority determination processing, the apparatus C has the highest priority in this example. The apparatus X having the highest priority before the power supply in the apparatus C is turned on has the non-highest priority.

In the present embodiment, the communication control unit 103 corresponds to connected state detection means, first identification means, and first judgment means. The communication control unit 103a corresponds to connected state detection means, power supply state detection means, first identification means, second identification means, identification means, first judgment means, second judgment means, and judgment means. The speech recognition operation inhibition setting unit 104 corresponds to first and second operation allowance/inhibition means.

The input/output interface 802 in the communication control unit 103 corresponds to first communication means, and the comparison register 805 in the communication control unit 103 corresponds to first comparison means. The input/output interface 802 in the communication control unit 103a corresponds to first communication means and second communication means, and the comparison register 805 in the communication control unit 103a corresponds to first comparison means and second comparison means. The memories 804 in the communication control unit 103 and the communication control unit 103a correspond to storage means.

Although in the above-mentioned embodiments, description was made of a case where the present invention is applied to the priority determination device, the priority determining method, and the priority determination program that determine the priorities for the speech recognition operation among the plurality of electronic apparatuses, the present invention is not limited to the electronic apparatuses each having the speech recognition device. For example, the present invention is also applicable to a case where priorities for another function are determined among the plurality of electronic apparatuses.

The invention claimed is:

1. A priority determination device provided in one of a plurality of electronic apparatuses that can be connected to one another, are respectively assigned priorities, and respectively have operation units each performing a predetermined operation, characterized by comprising:
   connected state detection means for detecting the change in the connected state of said plurality of electronic apparatuses;
   first identification means for identifying the electronic apparatus or apparatuses connected after the change in the connected state by communicating with the other electronic apparatus or apparatuses in response to the detection of the change by said connected state detection means;
   first judgment means for judging whether or not said one electronic apparatus has the highest priority on the basis of the priority of each of the electronic apparatuses identified by said first identification means; and
   first operation allowance/inhibition means for allowing the operation performed by said operation unit when said first judgment means judges that said one electronic apparatus has the highest priority, while inhibiting the operation performed by said operation unit when said first judgment means judges that said one electronic apparatus does not have the highest priority;
   characterized in which priorities are previously set, respectively, in identification information for identifying said plurality of electronic apparatuses,
   said first identification means comprising
      first communication means for receiving the identification information from the other electronic apparatus or apparatuses connected after the change in the connected state in response to the detection of the change by said connected state detection means, and transmitting the self identification information to the other electronic apparatus or apparatuses connected after the change in the connected state,
   said first judgment means comprising
      first comparison means for comparing the identification information for the other electronic apparatus or apparatuses received by said communication means with the self identification information, to judge whether or not said one electronic apparatus has the highest priority.

2. The priority determination device according to claim 1, characterized by further comprising
   storage means for storing apparatus connection information representing the electronic apparatuses which are connected to one another on the basis of the identification information for the other electronic apparatus or apparatuses received by said first communication means,
   said operation unit having the function of operating the electronic apparatuses connected on the basis of the apparatus connection information stored in said storage means.

3. The priority determination device according to claim 1 or 2, characterized by further comprising
   power supply state detection means for detecting the change in the states of power supplies in the plurality of electronic apparatuses which are connected to one another,
   second identification means for identifying the electronic apparatus in which the power supply is in the on state out of the other electronic apparatus or apparatuses connected after the change in the states of the power supplies by communicating with the connected other electronic apparatus or apparatuses in response to the detection of the change by said power supply state detection means,
   second judgment means for judging whether or not said one electronic apparatus has the highest priority on the basis of the priority of each of the electronic apparatuses identified by said second identification means, and
   second operation allowance/inhibition means for allowing the operation performed by said operation unit when said second judgment means judges that said one electronics apparatus has the highest priority, while inhibiting the operation performed by said operation unit when said second judgment means judges that said one electronic apparatus does not have the highest priority.

4. The priority determination device according to claim 3, characterized in that said second identification means comprises
   second communication means for receiving the identification information, together with power supply information representing the states of the power supplies, from the other electronic apparatus or apparatuses connected after the change in the states of the power supplies in response to the detection of the change by said power supply state detection means, and transmitting power supply information representing the state of the self power supply, together with the self identification information, to the other electronic apparatus or apparatuses connected after the change in the connected state, and
   said second judgment means comprises
      second comparison means for comparing the identification information for the electronic apparatuses in which the power supplies are in the on state on the basis of the power supply information for the other electronic apparatus or apparatuses and the self power supply information which have been received by said second communication means, to judge whether or not said one electronic apparatus out of the electronic apparatuses in which the power supplies are in the on state has the highest priority.

5. The priority determination device according to claim 1 or 2, characterized in that said operation unit comprises a speech recognition operation unit that performs a speech recognition operation.

6. A priority determining method provided in one of a plurality of electronic apparatuses that can be connected to one another, are respectively assigned priorities, and respectively have operation units each performing a predetermined operation, the priority determining method according to claim 1, characterized by comprising the steps of:

detecting the change in the connected state of said plurality of electronic apparatuses;

identifying the electronic apparatus or apparatuses, other than said one electronic apparatus, connected after the change in the connected state by communicating with the other electronic apparatus or apparatuses in response to the detection of the change;

judging whether or not said one electronic apparatus has the highest priority on the basis of the priority of each of the identified electronic apparatuses; and allowing the operation performed by said operation unit when it is judged that said one electronic apparatus has the V highest priority, while inhibiting the operation performed by said operation unit when it is judged that said one electronic apparatus does not have the highest priority.

7. The priority determining method according to claim 6, characterized in which priorities are previously set, respectively, in identification information for identifying said plurality of electronic apparatuses, said identifying step comprising the step of receiving the identification information from the other electronic apparatus or apparatuses connected after the change in the connected state in response to the detection of the change by said step of detecting the change in the connected state, and transmitting the self identification information to the other electronic apparatus or apparatuses connected after the change in the connected state, said judging step comprising the step of judging whether or not said one electronic apparatus has the highest priority by comparing the identification information for the other electronic apparatus or apparatuses received by said communication means with the self identification information.

8. The priority determining method according to claim 7, characterized by further comprising the step of storing apparatus connection information representing the electronic apparatuses which are connected to one another on the basis of said received identification information for the other electronic apparatus or apparatuses, said operation unit operating the electronic apparatuses connected on the basis of said stored apparatus connection information.

9. A priority determination device provided in one of a plurality of electronic apparatuses that can be connected to one another, are respectively assigned priorities, and respectively have operation units each performing a predetermined operation, characterized by comprising:

power supply state detection means for detecting the change in the states of power supplies in the plurality of electronic apparatuses which are connected to one another;

identification means for identifying the electronic apparatus in which the power supply is in the on state out of the electronic apparatus or apparatuses connected after the change in the states of the power supplies by communicating with the connected other electronic apparatus or apparatuses in response to the detection of the change by said power supply state detection means;

judgment means for judging whether or not said one electronic apparatus has the highest priority on the basis of the priority of each of the electronic apparatuses identified by said identification means; and operation allowance/inhibition means for allowing the operation performed by said operation unit when said judgment means judges that said one electronic apparatus has the highest priority, while inhibiting the operation performed by said operation unit when said judgment means judges that said one electronic apparatus does not have the highest priority;

characterized in which priorities are previously set, respectively, in identification information for identifying said plurality of electronic apparatuses, said identification means comprising communication means for receiving the identification information, together with power supply information representing the states of the power supplies, from the other electronic apparatus or apparatuses connected after the change in the states of the power supplies in response to the detection of the change by said power supply state detection means, and transmitting power supply information representing the state of the self power supply, together with the self identification information, to the other electronic apparatus or apparatuses connected after the change in the connected state, said judgment means comprising comparison means for comparing the identification information for the electronic apparatuses in which the power supplies are in the on state on the basis of the power supply information for the other electronic apparatus or apparatuses and the self power supply information which have been received by said communication means, to judge whether or not said one electronic apparatus out of the electronic apparatuses in which the power supplies are in the on state has the highest priority.

10. The priority determination device according to claim 1, characterized by further comprising storage means for storing apparatus connection information representing the electronic apparatuses which are connected to one another on the basis of the identification information for the other electronic apparatus or apparatuses received by said communication means, said operation unit having the function of operating the electronic apparatuses connected on the basis of the apparatus connection information stored in said storage means.

11. The priority determination device according to claim 9 or 10, characterized in that said operation unit comprises a speech recognition operation unit that performs a speech recognition operation.

12. A priority determining method provided in one of a plurality of electronic apparatuses that can be connected to one another, are respectively assigned priorities, and respectively have operation units each performing a predetermined operation, characterized by comprising the steps of:

detecting the change in the states of power supplies in the plurality of electronic apparatuses which are connected to one another;

identifying the electronic apparatus in which the power supply is in the on state out of the electronic apparatus or apparatuses connected after the change in the states of the power supplies by communicating with the connected other electronic apparatus or apparatuses in response to the detection of the change by said step of detecting the change in the states of the power supplies;

judging whether or not said one electronic apparatus has the highest priority on the basis of the priority of each of the electronic apparatuses identified by said step of identifying the electronic apparatus in which the power supply is in the on state; and allowing the operation performed by said operation unit when it is judged that said one electronic apparatus has the highest priority, while inhibiting the operation performed by said operation unit when it is judged that said one electronic apparatus does not have the highest priority;

characterized in which priorities are previously set, respectively, in identification information for identifying said plurality of electronic apparatuses, said identifying step comprising the step of receiving the identification information, together with power supply information representing the states of the power supplies, from the other electronic apparatus or apparatuses connected after the change in the states of the power supplies in response to the detection of the change, and transmitting the power supply information representing the state of the self power supply, together with the self identification information, to the other electronic apparatus or apparatuses connected after the change in the connected state, said judging step comprising the step of judging whether or not said one electronic apparatus out of the electronic apparatuses in which the power supplies are in the on state has the highest priority by comparing the identification information for the electronic apparatuses in which the power supplies are in the on state on the basis of the power supply information for the other electronic apparatus or apparatuses and the self power supply information which have been received.

13. The priority determining method according to claim 12, characterized by further comprising the step of storing apparatus connection information representing the electronic apparatuses which are connected to one another on the basis of said received identification information for the other electronic apparatus or apparatuses, said operation unit operating the electronic apparatuses connected on the basis of said stored apparatus connection information.

14. A priority determination program executed by a processing device in one of a plurality of electronic apparatuses that can be connected to one another, are respectively assigned priorities, and respectively have operation units each performing a predetermined operation, characterized by comprising:

processing for detecting the change in the connected state of said plurality of electronic apparatuses;

processing for identifying the electronic apparatus or apparatuses, other than said one electronic apparatus, connected after the change in the connected state by communicating with the other electronic apparatus or apparatuses in response to the detection of the change;

processing for judging whether or not said one electronic apparatus has the highest priority on the basis of the priority of each of the identified electronic apparatuses; and processing for allowing the operation performed by said operation unit when it is judged that said one electronic apparatus has the highest priority, while inhibiting the operation performed by said operation unit when it is judged that said one electronic apparatus does not have the highest priority;

characterized in which priorities are previously set, respectively, in identification information for identifying said plurality of electronic apparatuses, said identifying processing comprising processing for receiving the identification information from the other electronic apparatus or apparatuses connected after the change in the connected state in response to the detection of the change in the connected state by the processing for detecting the change, and transmitting the self identification information to the other electronic apparatus or apparatuses connected after the change in the connected state, said judging processing comprising processing for judging whether or not said one electronic apparatus has the highest priority by comparing the received identification information for the other electronic apparatus or apparatuses with the self identification information.

15. The priority determination program according to claim 14, characterized by further comprising processing for storing apparatus connection information representing the electronic apparatuses which are connected to one another on the basis of said received identification information for the other electronic apparatus or apparatuses, said operation unit operating the electronic apparatuses connected on the basis of said stored apparatus connection information.

16. A priority determination program executed by a processing device in one of a plurality of electronic apparatuses that can be connected to one another, are respectively assigned priorities, and respectively have operation units each performing a predetermined operation, characterized by comprising:

processing for detecting the change in the states of power supplies in the plurality of electronic apparatuses which are connected to one another;

processing for identifying the electronic apparatus in which the power supply is in the on state out of the electronic apparatus or apparatuses connected after the change in the states of the power supplies by communicating with the connected other electronic apparatus or apparatuses in response to the detection of the change in the states of the power supplies by said processing for detecting the change;

processing for judging whether or not said one electronic apparatus has the highest priority on the basis of the priority of each of the identified electronic apparatuses; and processing for allowing the operation performed by said operation unit when it is judged that said one electronic apparatus has the highest priority, while inhibiting the operation performed by said operation unit when it is judged that said one electronic apparatus does not have the highest priority;

characterized in which priorities are previously set, respectively, in identification information for identifying said plurality of electronic apparatuses, said identifying processing comprising processing for receiving the identification information, together with power supply information representing the states of the power supplies, from the other electronic apparatus or apparatuses connected after the change in the states of the power supplies in response to the detection of the change, and transmitting power supply information representing the state of the self power supply, together with the self identification information, to the other electronic apparatus or apparatuses connected after the change in the connected state, said judging processing comprising processing for judging whether or not said one electronic apparatus out of the electronic apparatuses in which the power supplies are in the on state has the highest priority by comparing the identification information for the electronic apparatuses in which the power supplies are in the on state on the basis of the power supply information for the other electronic apparatus or apparatuses and the self power supply information which have been received.

17. The priority determination program according to claim 16, characterized by further comprising processing for storing apparatus connection information representing the electronic apparatuses which are connected to one another on the basis of said received identification information for the other electronic apparatus or apparatuses, said operation unit operating the electronic apparatuses connected on the basis of said stored apparatus connection information.

* * * * *